US011749000B2

(12) United States Patent
Thibaux et al.

(10) Patent No.: US 11,749,000 B2
(45) Date of Patent: Sep. 5, 2023

(54) STOP LOCATION CHANGE DETECTION

(71) Applicant: WAYMO LLC, Mountain View, CA (US)

(72) Inventors: Romain Thibaux, Fremont, CA (US); David Harrison Silver, San Carlos, CA (US); Congrui Hetang, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 135 days.

(21) Appl. No.: 17/131,232

(22) Filed: Dec. 22, 2020

(65) Prior Publication Data
US 2022/0198199 A1 Jun. 23, 2022

(51) Int. Cl.
*G06K 9/00* (2022.01)
*B60W 30/18* (2012.01)
(Continued)

(52) U.S. Cl.
CPC ......... *G06V 20/588* (2022.01); *B60W 30/181* (2013.01); *B60W 30/18154* (2013.01);
(Continued)

(58) Field of Classification Search
CPC ......... B60W 2420/42; B60W 2552/00; B60W 2552/53; B60W 2555/20; B60W 30/181;
(Continued)

(56) References Cited

U.S. PATENT DOCUMENTS

| | | | |
|---|---|---|---|
| 5,940,010 | A | 8/1999 | Sasaki et al. |
| 7,068,154 | B2 | 6/2006 | Kudo |

(Continued)

FOREIGN PATENT DOCUMENTS

GB    2523659 A    9/2015

OTHER PUBLICATIONS

Barth, Alexander, et al., Fast and Precise Localization at Stop Intersections, 2013 IEEE Intelligent Vehicles Symposium Workshops, 2013, pp. 75-86.
(Continued)

*Primary Examiner* — Michael J Vanchy, Jr.
(74) *Attorney, Agent, or Firm* — Botus Churchill IP Law LLP

(57) ABSTRACT

The technology relates to approaches for determining appropriate stopping locations at intersections for vehicles operating in a self-driving mode. While many intersections have stop lines painted on the roadway, many others have no such lines. Even if a stop line is present, the physical location may not match what is in store map data, which may be out of date due to construction or line repainting. Aspects of the technology employ a neural network that utilizes input training data and detected sensor data to perform classification, localization and uncertain estimation processes. Based on these processes, the system is able to evaluate distribution information for possible stop locations. The vehicle uses such information to determine an optimal stop point, which may or may not correspond to a stop line in the map data. This information is also used to update the existing map data, which can be shared with other vehicles.

10 Claims, 35 Drawing Sheets

(51) Int. Cl.
*G06K 9/32* (2006.01)
*G06K 9/62* (2022.01)
*G06V 20/56* (2022.01)
*G06V 10/25* (2022.01)
*G06F 18/214* (2023.01)
*G06F 18/2413* (2023.01)

(52) U.S. Cl.
CPC ...... *G06F 18/214* (2023.01); *G06F 18/24147* (2023.01); *G06V 10/25* (2022.01); *B60W 2420/42* (2013.01)

(58) Field of Classification Search
CPC .......... B60W 30/18154; B60W 60/001; G06K 9/6256; G06K 9/6276; G06V 10/25; G06V 20/588
See application file for complete search history.

(56) References Cited

U.S. PATENT DOCUMENTS

| | | | |
|---|---|---|---|
| 8,184,859 B2 | 5/2012 | Tanji | |
| 8,279,086 B2 | 10/2012 | Liu et al. | |
| 8,638,990 B2 | 1/2014 | Kudo | |
| 9,081,385 B1 | 7/2015 | Ferguson et al. | |
| 9,707,960 B2 | 7/2017 | Gutmann et al. | |
| 10,126,136 B2 | 11/2018 | Iagnemma | |
| 10,134,276 B1 | 11/2018 | Barker | |
| 10,318,824 B2 | 6/2019 | Zhang et al. | |
| 10,473,470 B2 | 11/2019 | Iagnemma et al. | |
| 10,733,506 B1 | 8/2020 | Ogale et al. | |
| 2007/0041614 A1 | 2/2007 | Tanji | |
| 2011/0118929 A1* | 5/2011 | Takae | B60K 35/00 701/31.4 |
| 2011/0135155 A1* | 6/2011 | Kudo | G08G 1/0962 382/104 |
| 2014/0309812 A1* | 10/2014 | Lee | H04L 67/12 701/2 |
| 2016/0026878 A1 | 1/2016 | Zhang et al. | |
| 2017/0341643 A1 | 11/2017 | Gutmann et al. | |
| 2017/0350713 A1 | 12/2017 | Bhatia et al. | |
| 2019/0294896 A1 | 9/2019 | Jia et al. | |
| 2019/0339694 A1 | 11/2019 | Akman | |
| 2020/0026277 A1 | 1/2020 | Palanisamy et al. | |
| 2020/0211370 A1 | 7/2020 | Chen | |
| 2020/0341466 A1* | 10/2020 | Pham | G06N 3/088 |
| 2021/0231459 A1* | 7/2021 | Neyama | G06F 16/2379 |

OTHER PUBLICATIONS

Dakic, Igor, et al., On development of arterial fundamental diagrams based on surrogate density measures from adaptive traffic control systems utilizing stop-line detection, Transportation Research Procedia, 2017, pp. 942-961.

Kang, Jeong Min, et al., Lane-Level Map-Matching Method for Vehicle Localization Using GPS and Camera on a High-Definition Map, Sensors, MDPI, 2020, pp. 1-22.

Lambert, Fred, Tesla Autopilot now detects stop lines in move to handle intersections, electrek, 2019, pp. 1-4.

Lee, Byung-Hyun, et al., GPS/DR Error Estimation for Autonomous Vehicle Localization, Sensors, MDPI, 2015, pp. 20779-20798.

Lin, Guan-Ting, et al., Stop Line Detection and Distance Measurement for Road Intersection based on Deep Learning Neural Network, APSIPA, 2017, pp. 1-5.

Marita, Tiberiu, et al., Stop-line Detection and Localization Method for Intersection Scenarios, IEEE, 2011, pp. 293-298.

Middleton, Dan, et al., Improving Stop Line Detection Using Video Imaging Detectors, Texas Department of Transportation, 2010, pp. 1-94.

Seo, Young-Woo, A Vision System for Detection and Tracking of Stop-Lines, The Robotics Institute, Carnegie Mellon University, 2014, pp. 1-18.

Suhr, Jae Kyu, et al., Fast Symbolic Road Marking and Stop-line Detection for Vehicle Localization, 2015 IEEE Intelligent Vehicles Symposium (IV), pp. 186-191.

Xu, Runsheng, et al., Holistic Grid Fusion Based Stop Line Estimation, arXiv:2009.09093v1, 2020, pp. 1-9.

* cited by examiner

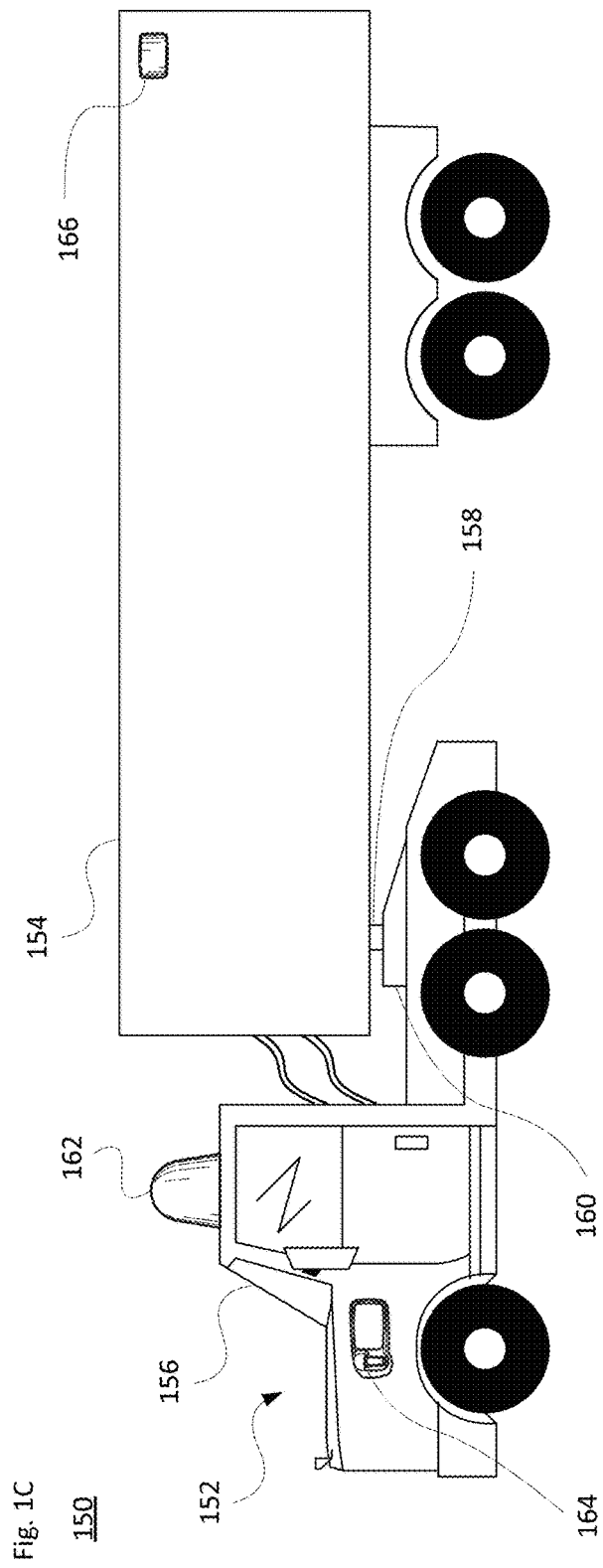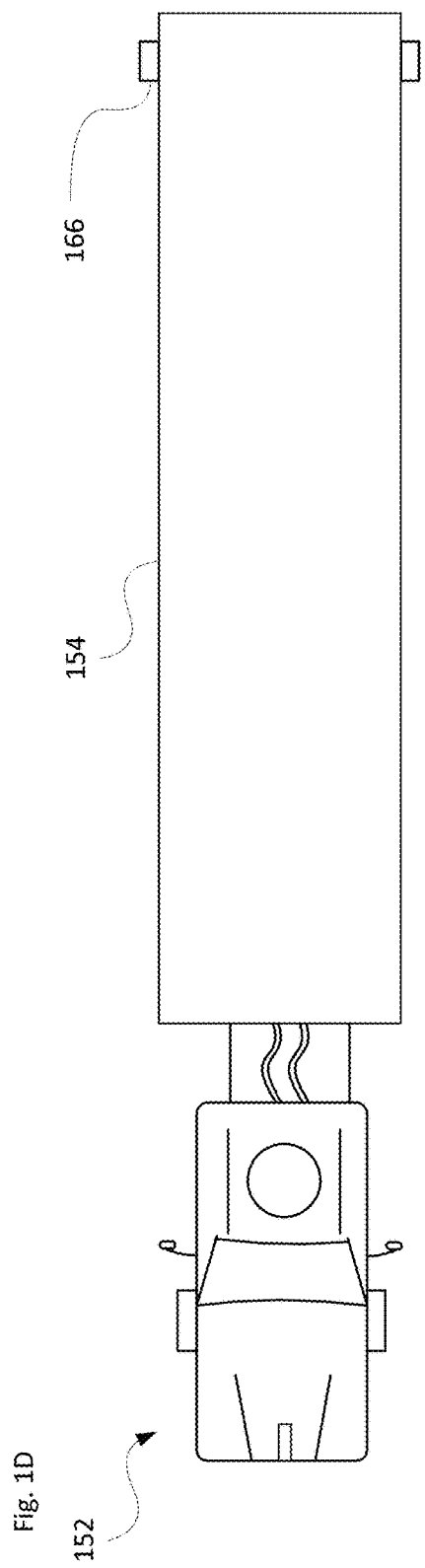

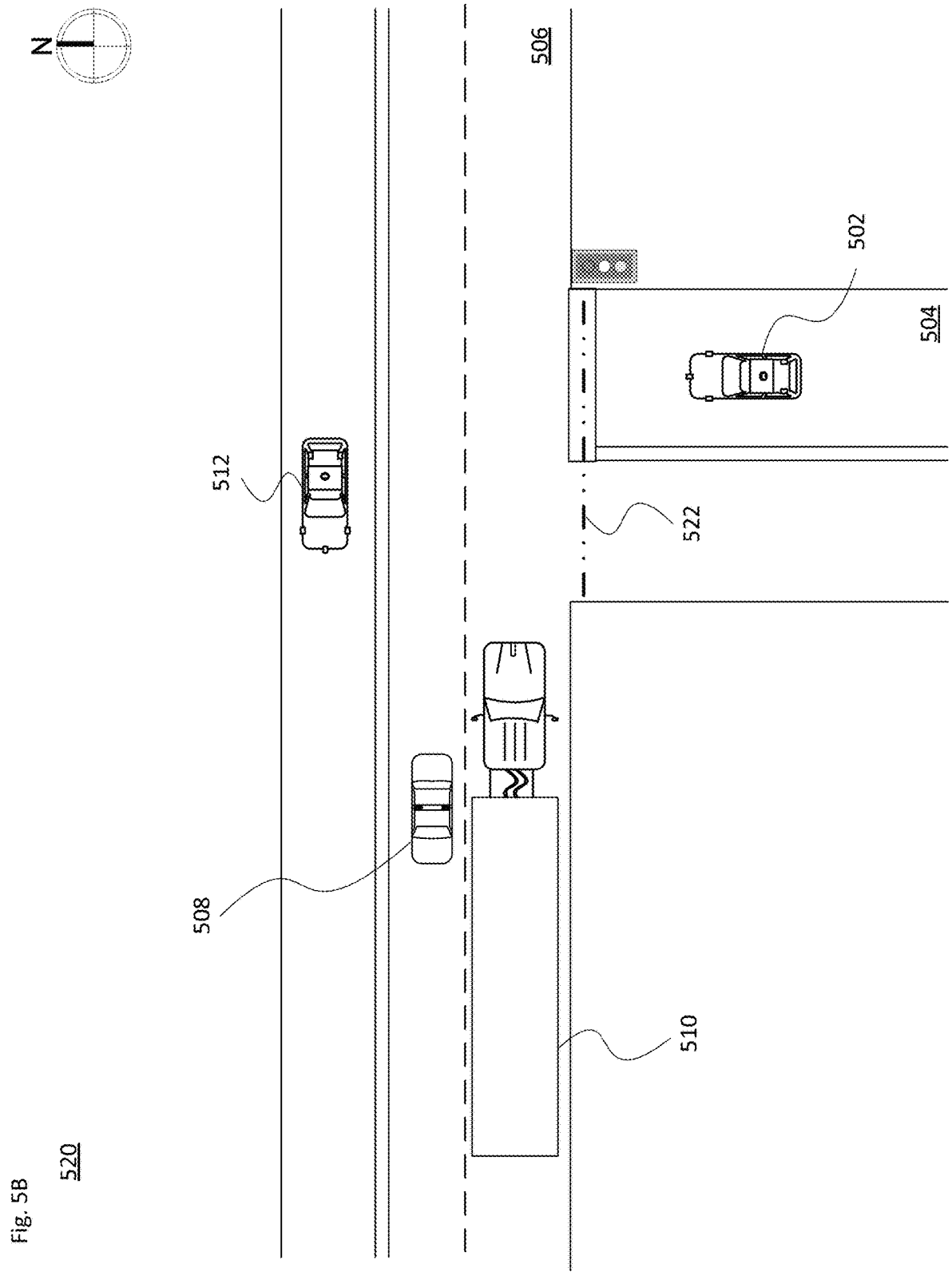

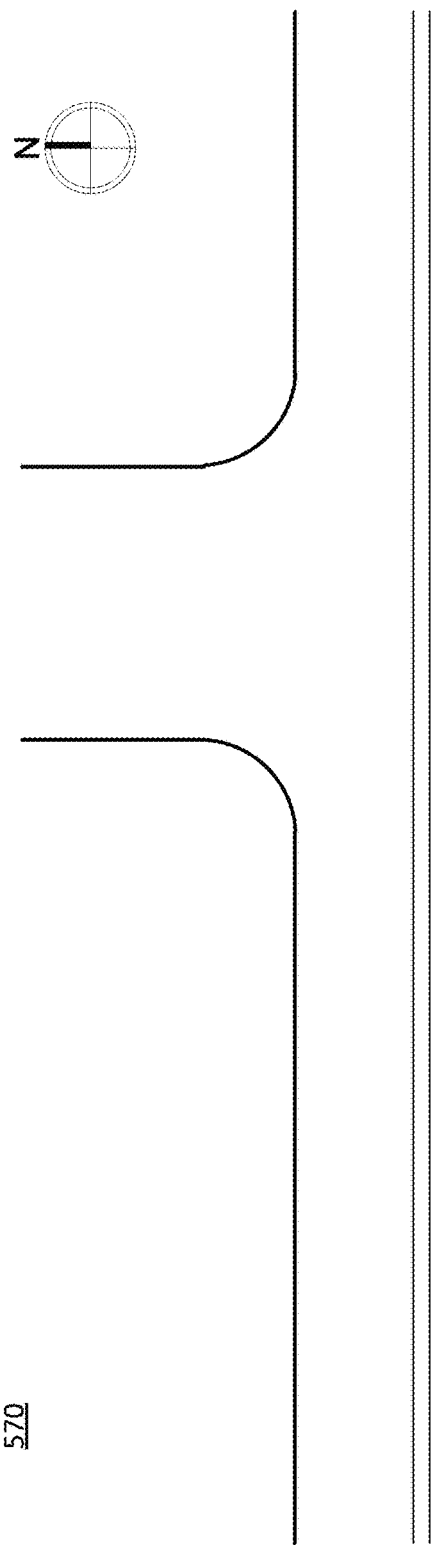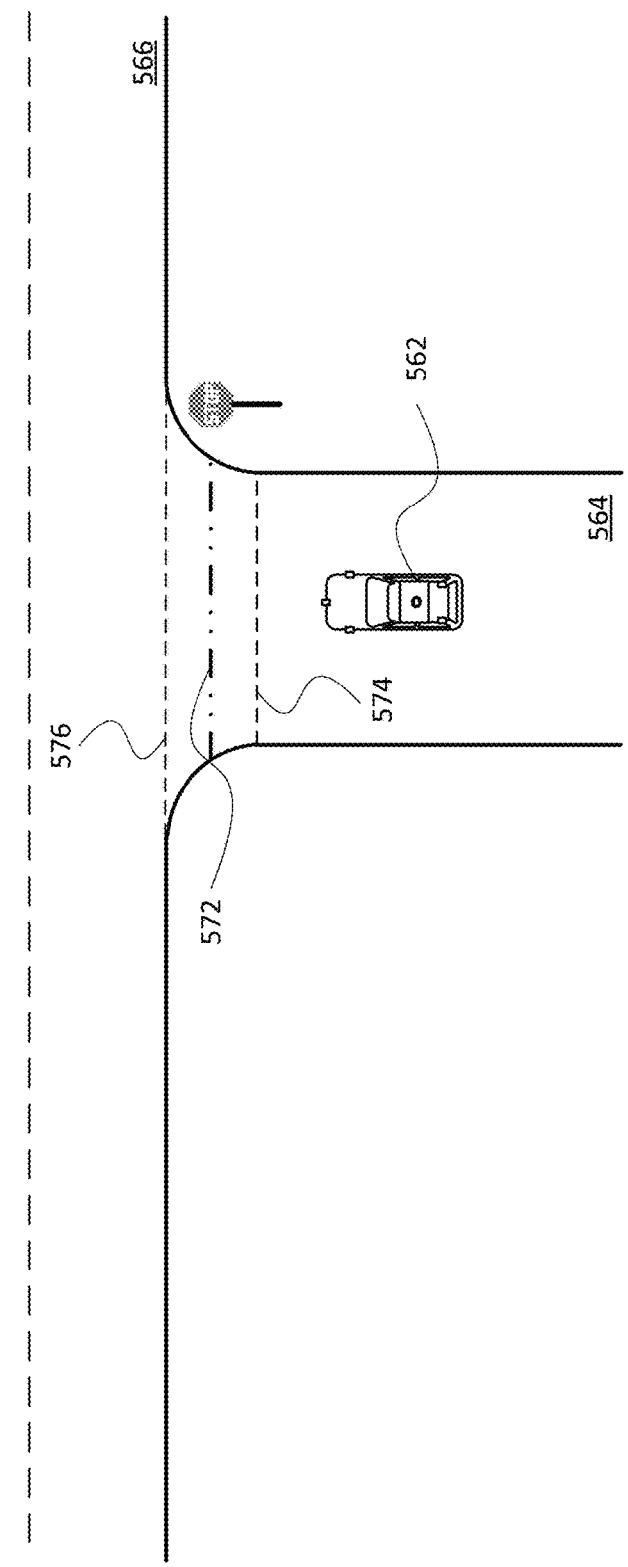
Fig. 5F

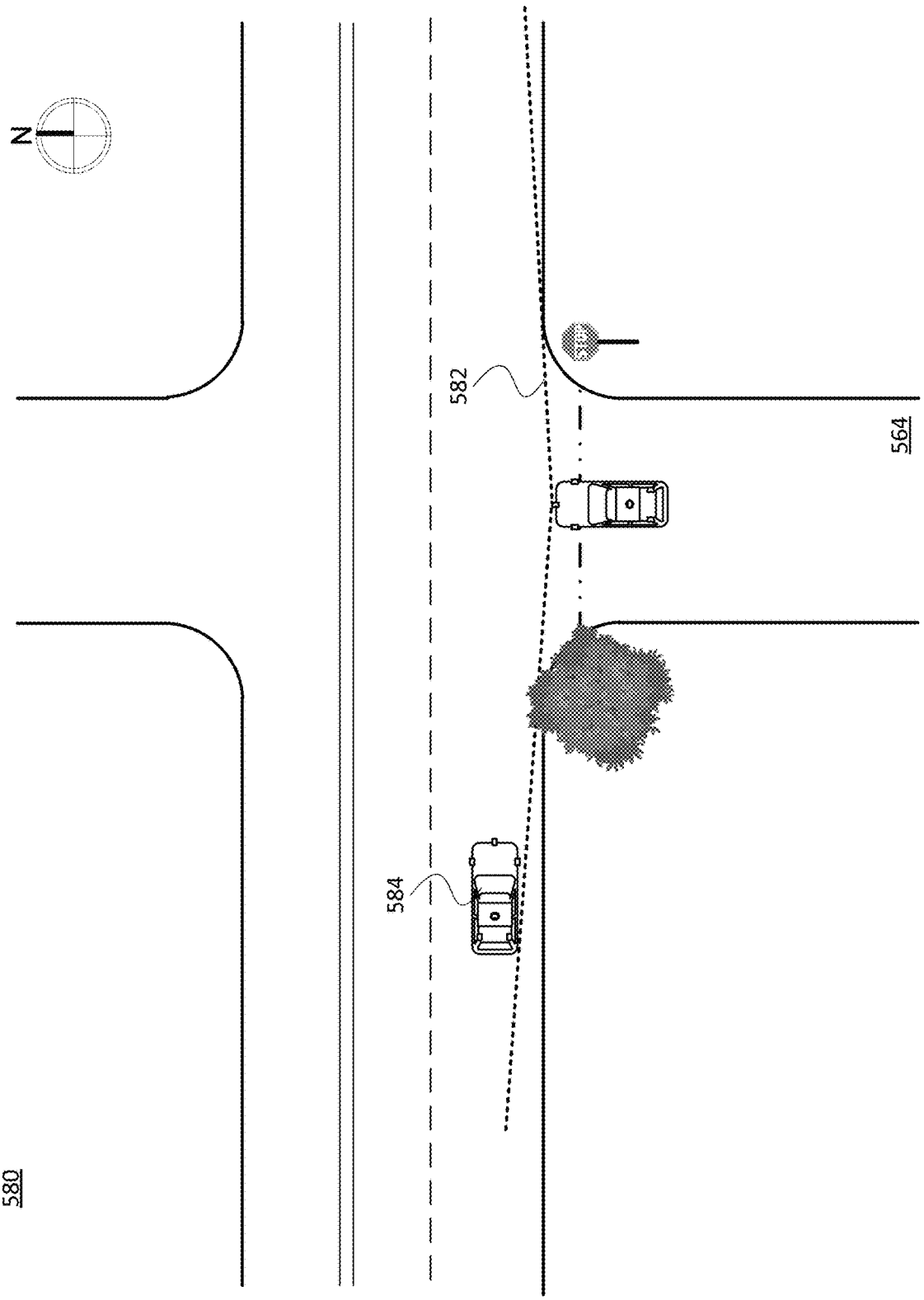

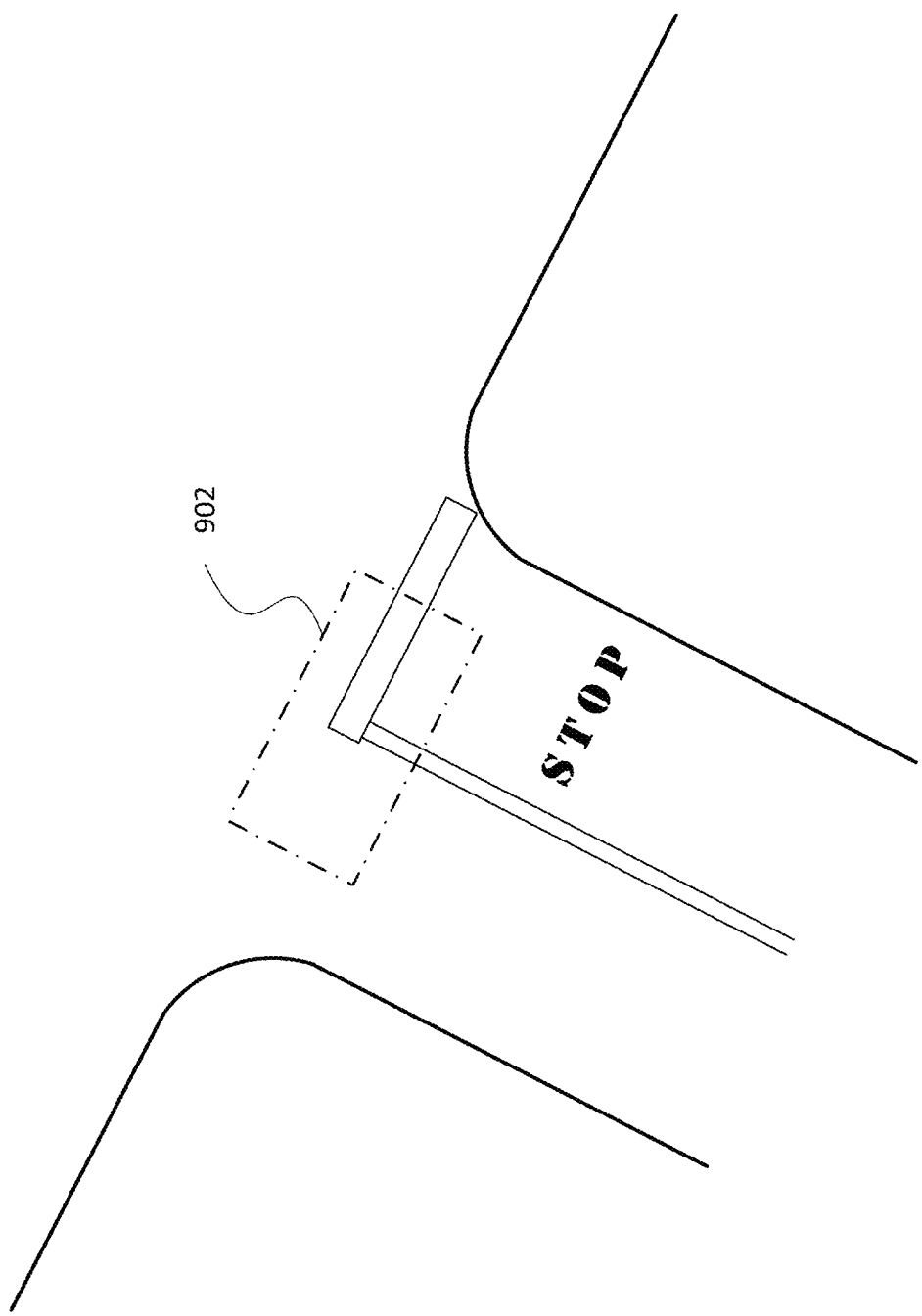

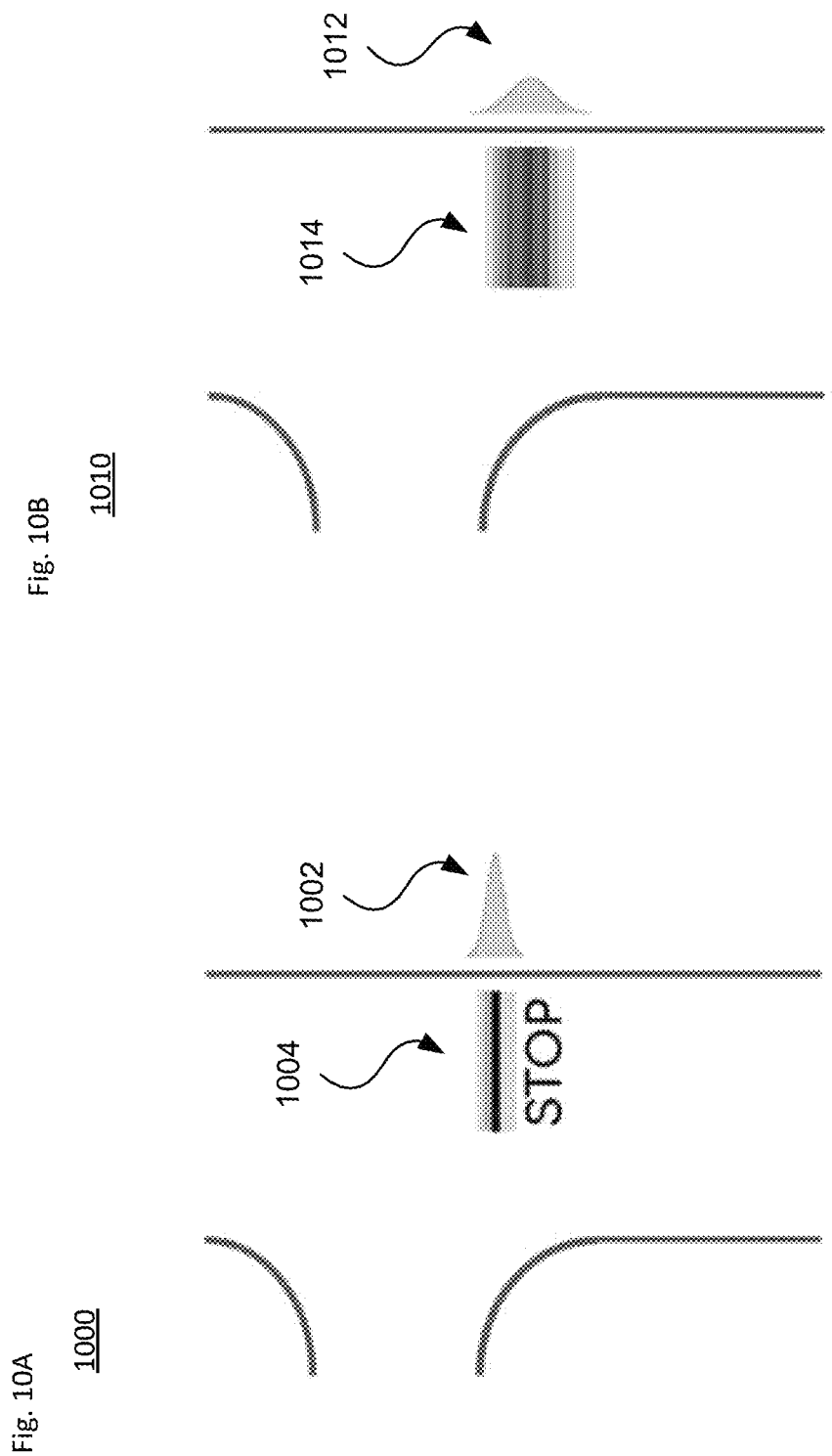

1120

1140

1130

1230

1220

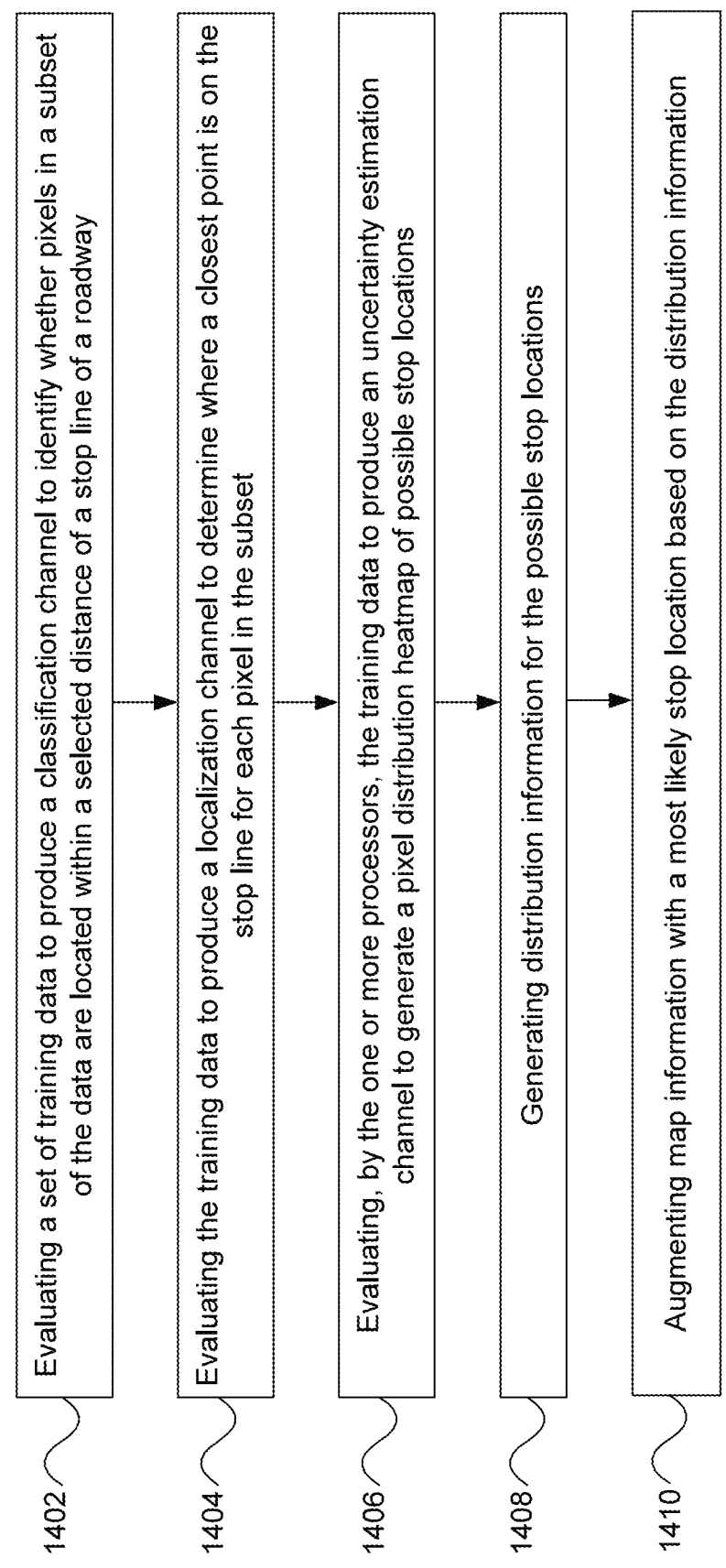

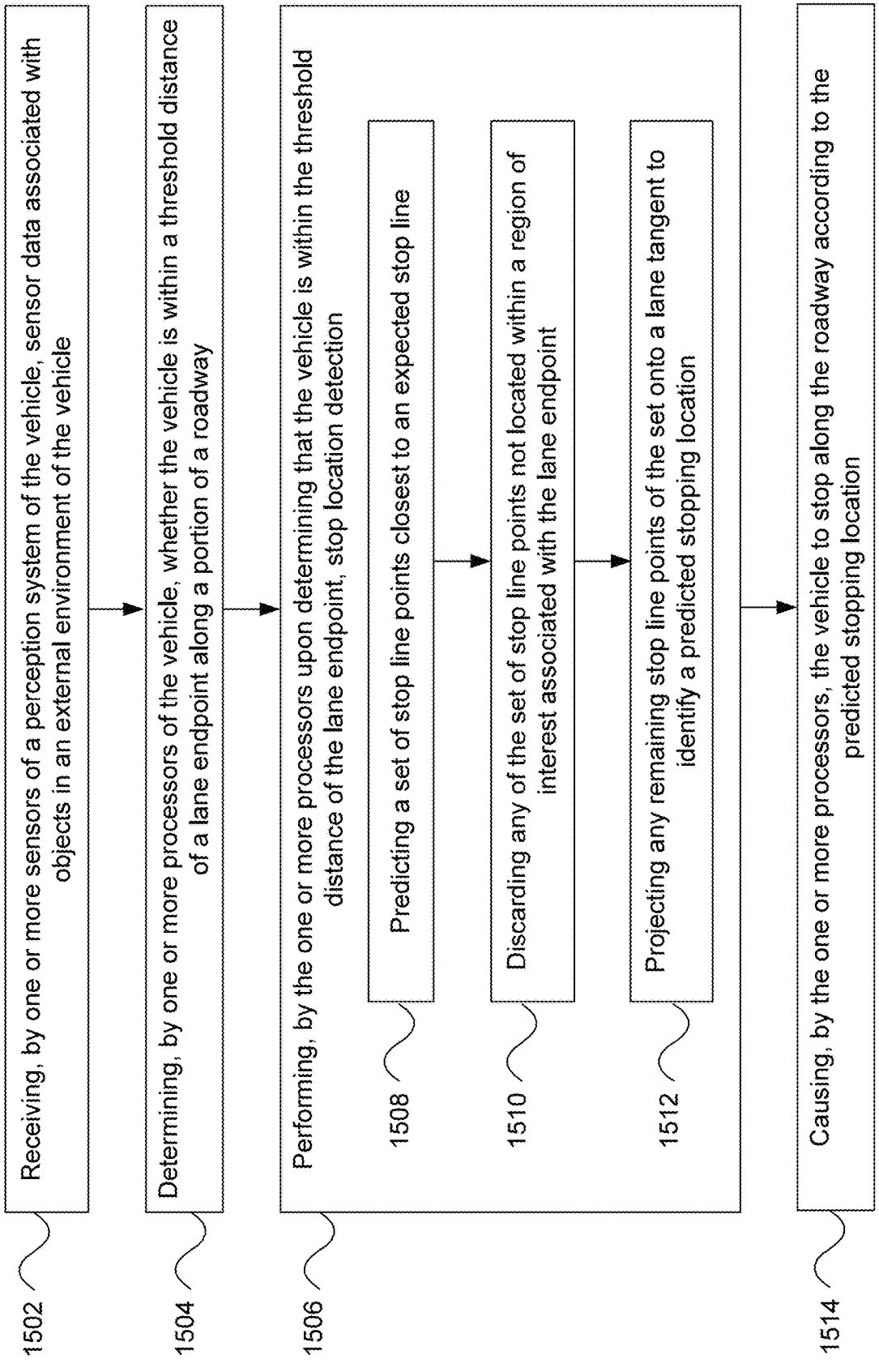

STOP LOCATION CHANGE DETECTION

BACKGROUND

Self-driving vehicles that operate in an autonomous driving mode may transport passengers or cargo or other items from one location to another. In many situations, a self-driving vehicle will need to stop at an intersection or other location that has a stop sign, a yield sign or a stop light. In some instances, a stop line may be painted on the roadway to indicate where vehicles should stop, while in other instances there may be no stop line. In the former case, while the stop line may have been previously mapped, it is possible for its location to change due to construction or road resurfacing, or become hard to detect due to road wear and tear. In such situations or cases without any stop line, the vehicle needs to determine an appropriate stopping point. This can be challenging to do in real time, and the stopping point may also impact the ability of the vehicle to detect approaching vehicles and other objects along cross streets.

BRIEF SUMMARY

The technology relates to approaches for determining appropriate stopping locations at intersections. Painted stop lines are common to denote where a lead vehicle should stop/yield at a stop sign, yield sign, or traffic signal. Sometimes stop lines are not present due to other markings (e.g., the front edge of a crosswalk serves as the stop line). On residential or lower speed streets, it may be common to not have a painted stop line. In these cases, drivers need to infer where the stop location should be. However, this can be particularly challenging for self-driving vehicles operating in an autonomous driving mode.

According to one aspect, a method of determining a stop location for a vehicle operating in an autonomous driving mode is provided. The method comprises evaluating, by one or more processors, a set of training data to produce a classification channel to identify whether pixels in a subset of the sensor data are located within a selected distance of a stop line of a roadway; evaluating, by the one or more processors, the set of training data to produce a localization channel to determine where a closest point is on the stop line for each pixel in the subset; evaluating, by the one or more processors, the set of training data to produce an uncertainty estimation channel to generate a pixel distribution heatmap of possible stop locations; and generating, by the one or more processors, distribution information for the possible stop locations; and augmenting, by the one or more processors, map information with a most like stop location based on the distribution information.

In one example, the method further comprises disseminating the augmented map information to one or more vehicles for use when operating in an autonomous driving mode. The augmented map information includes at least one labeled stop line location based on the distribution information.

The classification channel may provide a probability heatmap indicative of whether the stop line is nearby. The classification channel may be a binary classification channel. When there is no stop line on the roadway, the method may include determining the possible stop locations based upon a shape of an intersection. In this case, determining the possible stop locations may be further based on one or more detected roadgraph features associated with the intersection.

The localization channel may provide a set of vectors each corresponding to a set of pixels in a map of the roadway, the set of vectors pointing to a nearest point on the stop line. The method may further comprise creating a label for the uncertainty estimation channel for an estimated stop line location. The classification channel, the localization channel and the uncertainty estimation channel may be implemented as outputs of a neural network. And in another example, the training data includes sensor data comprising lidar point cloud data and camera image information.

According to another aspect, a method of controlling a vehicle operating in an autonomous driving mode is provided. The method comprises receiving, by one or more sensors of a perception system of the vehicle, sensor data associated with objects in an external environment of the vehicle; determining, by one or more processors of the vehicle, whether the vehicle is within a threshold distance of a lane endpoint along a portion of a roadway; performing, by the one or more processors upon determining that the vehicle is within the threshold distance of the lane endpoint, stop location detection. Performing the stop location detection includes: predicting a set of stop line points closest to an expected stop line; discarding any of the set of stop line points not located within a region of interest associated with the lane endpoint; and projecting any remaining stop line points of the set onto a lane tangent to identify a predicted stopping location. The method further includes causing, by the one or more processors, the vehicle to stop along the roadway according to the predicted stopping location.

In one example, the set of stop line points is predicted based on (i) a heat map according to the received sensor data and (ii) a vector field including a set of vectors, each vector being associated with a corresponding given pixel of a set of pixels in the heat map. Here, the stop line points may be weighted by scores at corresponding ones of the given pixels.

The threshold distance may be selected in accordance with sensor visibility for the one or more sensors of the perception system. In this case, the threshold distance may be selected according to one or more of vehicle size, vehicle type or sensor configuration. In another example, the method further comprises augmenting map information in accordance with the predicted stopping location.

According to a further aspect, a vehicle is configured to operate in an autonomous driving mode. The vehicle comprises a perception system, a driving system, a positioning system, and a control system. The perception system includes one or more sensors that are configured to receive sensor data associated with objects in an external environment of the vehicle. The driving system includes a steering subsystem, an acceleration subsystem and a deceleration subsystem to control driving of the vehicle. The positioning system is configured to determine a current position of the vehicle. And the control system includes one or more processors. The control system is operatively coupled to the driving system, the perception system and the positioning system. The control system is configured to determine whether the vehicle is within a threshold distance of a lane endpoint along a portion of a roadway and perform, upon determining that the vehicle is within the threshold distance of the lane endpoint, stop location detection. The stop location detection includes: prediction of a set of stop line points closest to an expected stop line; discarding any of the set of stop line points not located within a region of interest associated with the lane endpoint; and projection of any remaining stop line points of the set onto a lane tangent to identify a predicted stopping location. The control system is further configured to cause the vehicle to stop along the roadway according to the predicted stopping location.

In one example, prediction of the set of stop line points is based on (i) a heat map according to the received sensor data and (ii) a vector field including a set of vectors, each vector being associated with a corresponding given pixel of a set of pixels in the heat map. In another example, the threshold distance is selected in accordance with sensor visibility for the one or more sensors of the perception system. Here, the threshold distance may be selected according to one or more of vehicle size, vehicle type or sensor configuration.

BRIEF DESCRIPTION OF THE DRAWINGS

FIGS. 1C-D illustrate an example cargo-type vehicle configured for use with aspects of the technology.

FIGS. 5A-G illustrate exemplary stop line scenarios in accordance with aspects of the technology.

FIG. 9 illustrate a paint classification example in accordance with aspects of the technology.

FIGS. 10A-B illustrate example pixel distributions in accordance with aspects of the technology.

FIG. 14 illustrates an example method in accordance with aspects of the technology.

FIG. 15 illustrates another example method in accordance with aspects of the technology.

DETAILED DESCRIPTION

Figure 4A:
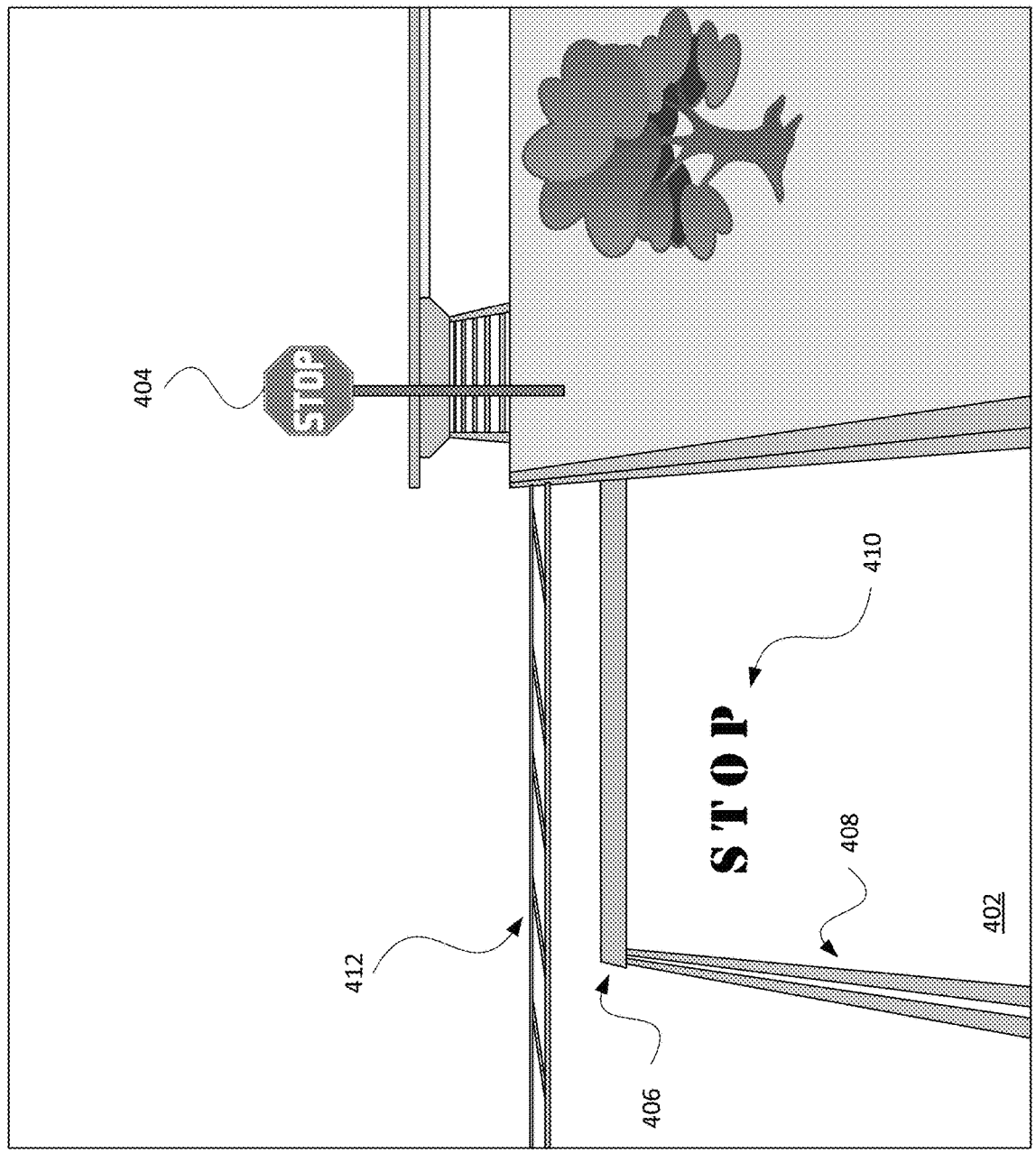
FIGS. 4A-B illustrate stop location scenarios in accordance with aspects of the technology.
Figure 4B:
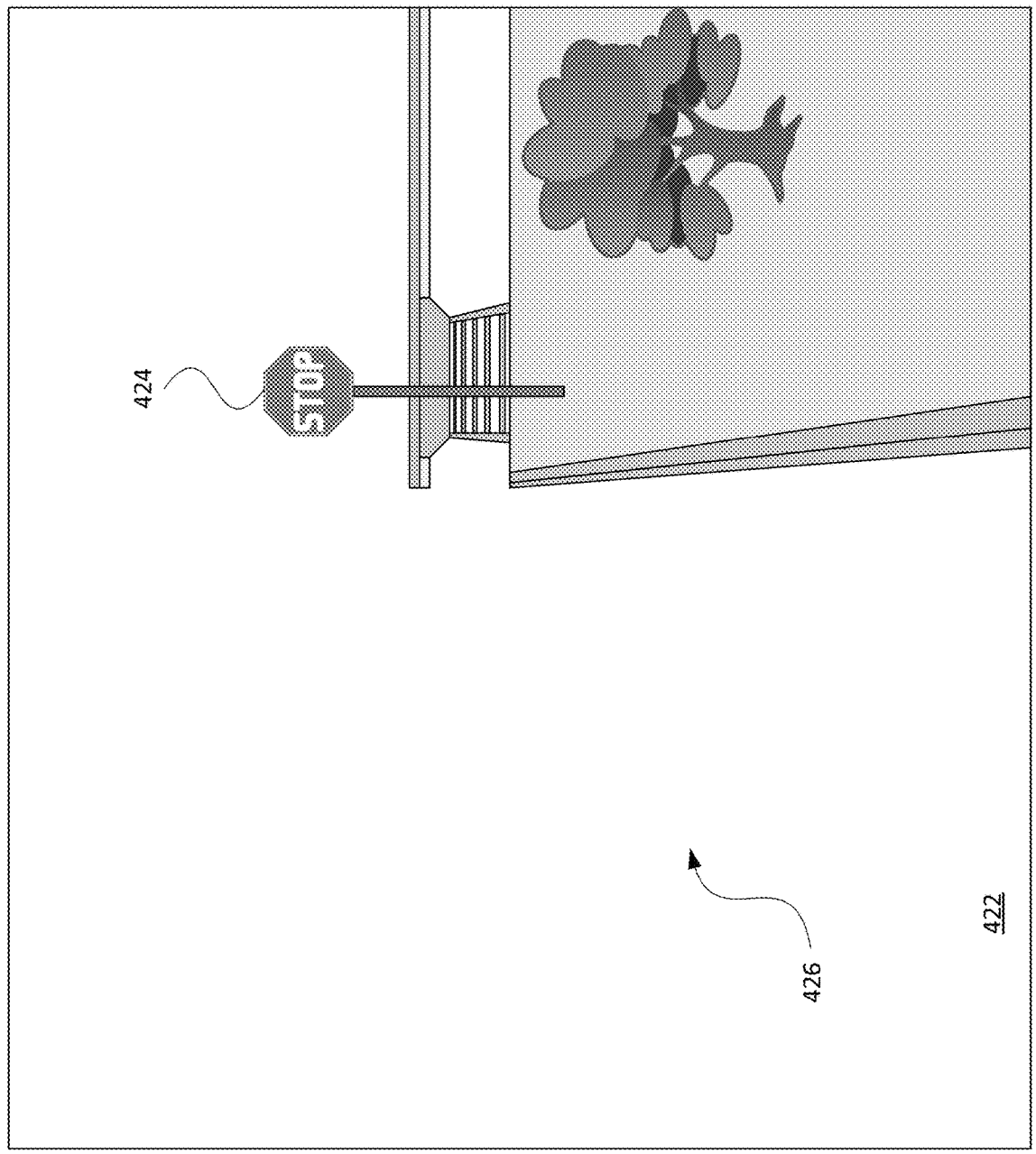

Operating a vehicle in a self-driving mode involves evaluating information about the vehicle's external environment. For instance, this can include determining whether there are static objects such as buildings, trees, signage, crosswalks or stop lines on the roadway, determining the presence of parked cars, motorcycles, or other vehicles on a side of the roadway, as well as determining whether there are vehicles or other road users moving along nearby sections of the roadway. In certain scenarios, such as at intersections, detection of approaching road users can be challenging if the self-driving vehicle does not stop at an appropriate stop location. For instance, FIG. 4B illustrates a situation where there is no stop line on the roadway to indicate where the vehicle should stop.

Certain self-driving architectures may encode the appropriate stop location for a particular intersection in an electronic map stored in the vehicle. However, there are many reasons that the appropriate stop location can change after such a map is created. For instance, a new stop line may have been painted where previously there was none. An existing stop line may have been moved, e.g., due to road resurfacing or line restriping. Or a new crosswalk may have been added or an existing crosswalk may have been moved. Other situations could involve the addition of a new traffic control to an intersection, necessitating a new or different stop location. Also, the geometry of an intersection could be changed, necessitating a different stop position. This may either occur without a stop line/crosswalk ever having been present, or it may also involve the removal of these markings. And a new intersection may be created, necessitating a new stop location determination (either from markings or geometry).

The technology provides a system and method that predict three properties of an intersection from onboard sensor data: (i) the most likely stop location, (ii) whether or not that location is visually marked (by a stop line, front of a crosswalk, etc.), and (iii) a probability distribution over longitudinal stop locations for when the stop location is not marked. According to an aspect of the technology, producing these outputs involves training a machine learning (ML) model from prior map data and/or additional human labeled data. For instance, the ML model may be trained ahead of time at a back-end system, while predicting the properties of the intersection is performed in real time by the vehicle's onboard computing system.

Once these outputs are available, they can be used in an autonomous vehicle to determine whether a stop location has been changed, and react accordingly. The nature of this reaction can depend on the confidence of the new location and also its nature. For instance, the vehicle could always take the more "conservative" position of the prior or detected location. Or the vehicle could react differently based on whether the prior location or detected location involve marked lines or not. Additionally, this approach can also be used in conjunction with detection of a new traffic control (e.g., a new traffic light, stop sign, yield sign, etc.) at either a previously known or new intersection. This approach can also be used offline, both to reduce human effort in a mapping process (e.g., by automatically identifying marked stop locations), or to improve the quality of human built maps (e.g., by making human marked stop locations more consistent/conform better to a desired policy).

Example Vehicle Systems

The technology may be employed in all manner of self-driving vehicles, including vehicles that transport passengers or items such as food deliveries, packages, cargo, etc. While certain aspects of the disclosure may be particularly useful in connection with specific types of vehicles, the vehicle may be different types of vehicle including, but not limited to, cars, van, motorcycles, cargo vehicles, buses, recreational vehicles, emergency vehicles, construction equipment, etc.

Figure 1A:
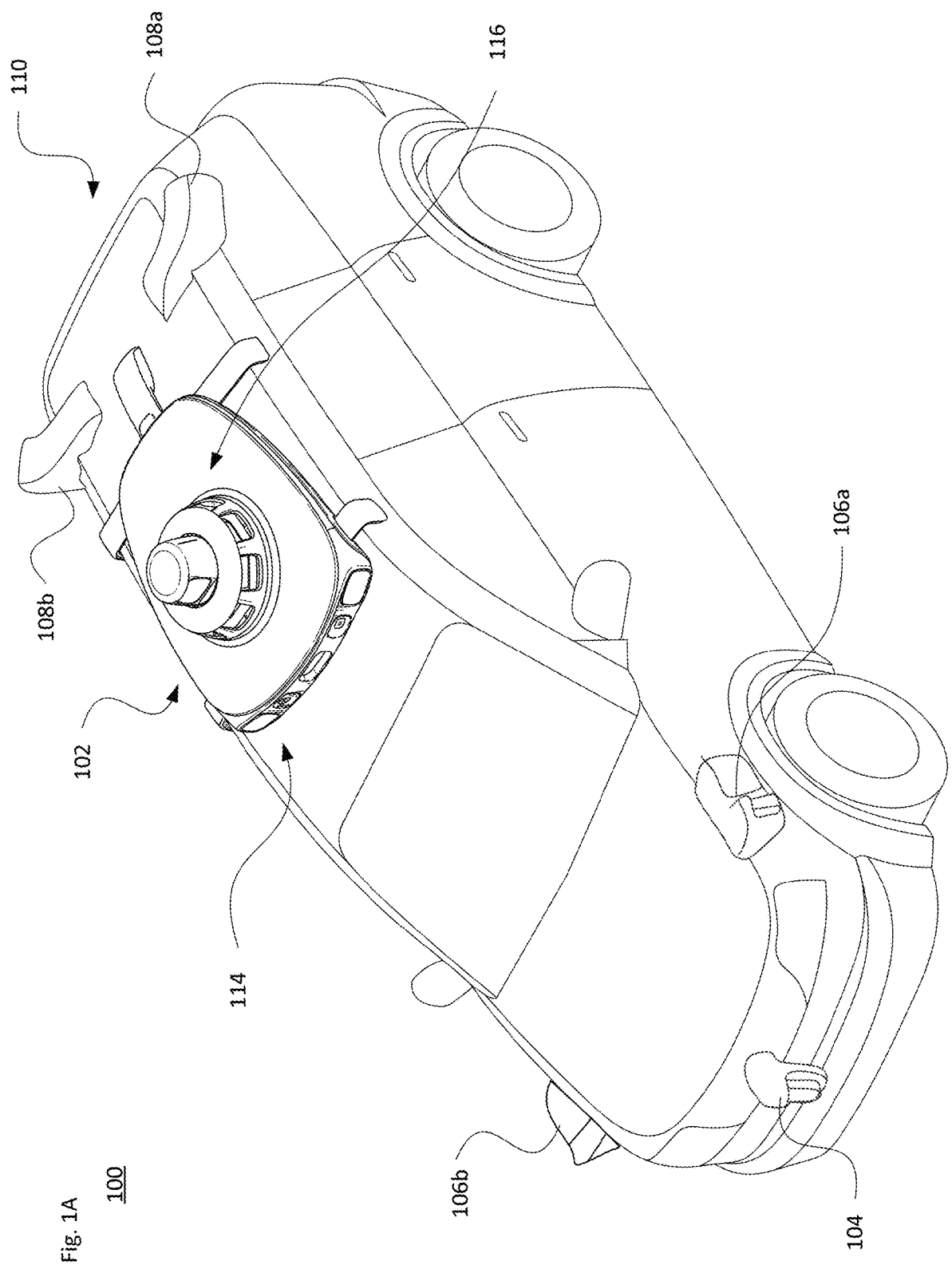
FIGS. 1A-B illustrate example self-driving vehicles in accordance with aspects of the technology.
Figure 1B:
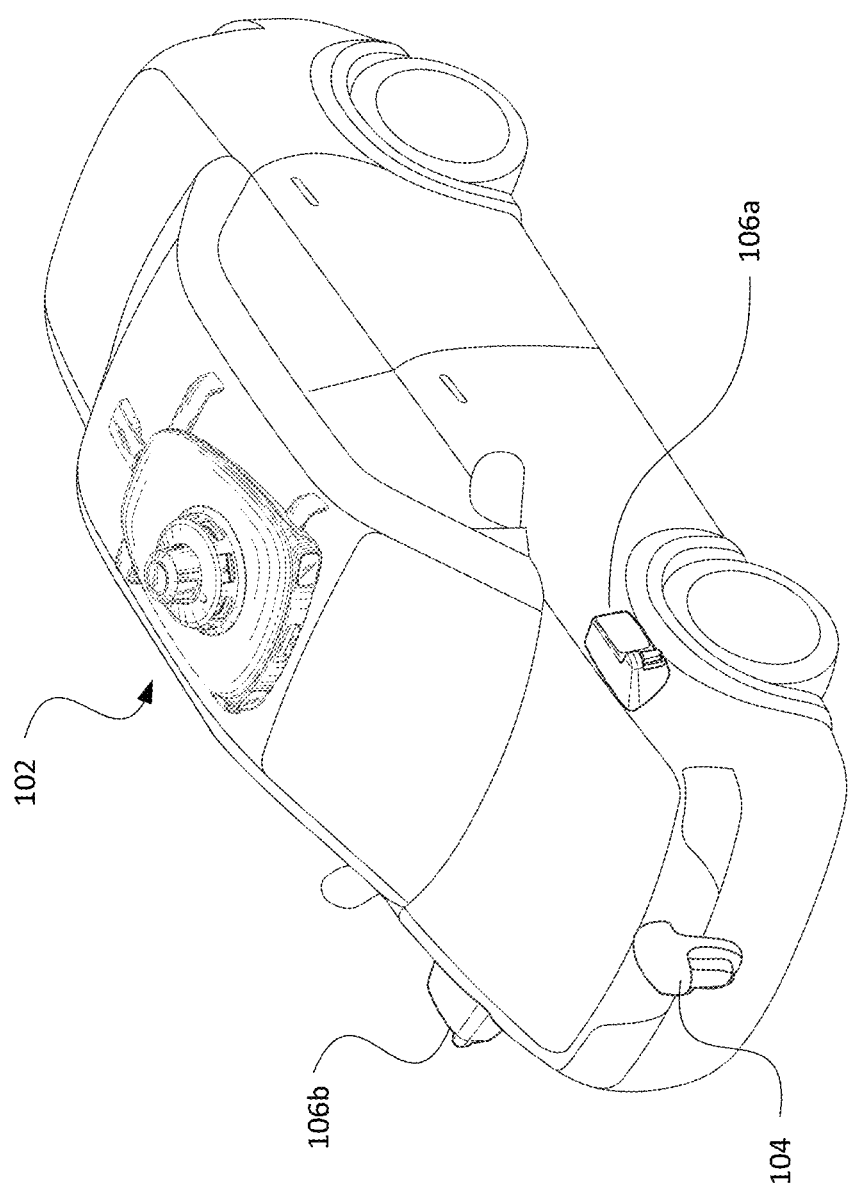

FIG. 1A illustrates a perspective view of an example passenger vehicle 100, such as a minivan or sport utility vehicle (SUV). FIG. 1B illustrates a perspective view of another example passenger vehicle 150, such as a sedan. The passenger vehicles may include various sensors for obtaining information about the vehicle's external environment. For instance, a roof-top housing unit (roof pod assembly) 102 may include a lidar sensor as well as various cameras (e.g., optical or infrared), radar units, acoustical sensors (e.g., microphone or sonar-type sensors), inertial (e.g., accelerometer, gyroscope, etc.) or other sensors (e.g., positioning sensors such as GPS sensors). Housing 104, located at the front end of vehicle 100, and housings 106a, 106b on the driver's and passenger's sides of the vehicle may each incorporate lidar, radar, camera and/or other sensors. For example, housing 106a may be located in front of the driver's side door along a quarter panel of the vehicle. As shown, the passenger vehicle 100 also includes housings 108a, 108b for radar units, lidar and/or cameras also located towards the rear roof portion of the vehicle. Additional lidar, radar units and/or cameras (not shown) may be located at other places along the vehicle 100. For instance, arrow 110 indicates that a sensor unit (not shown) may be positioned along the rear of the vehicle 100, such as on or adjacent to the bumper. Depending on the vehicle type and sensor housing configuration(s), acoustical sensors may be disposed in any or all of these housings around the vehicle.

Arrow 114 indicates that the roof pod 102 as shown includes a base section coupled to the roof of the vehicle. And arrow 116 indicated that the roof pod 102 also includes an upper section raised above the base section. Each of the base section and upper section may house different sensor units configured to obtain information about objects and conditions in the environment around the vehicle. The roof pod 102 and other sensor housings may also be disposed along vehicle 150 of FIG. 1B. By way of example, each sensor unit may include one or more sensors of the types described above, such as lidar, radar, camera (e.g., optical or infrared), acoustical (e.g., a passive microphone or active sound emitting sonar-type sensor), inertial (e.g., accelerometer, gyroscope, etc.) or other sensors (e.g., positioning sensors such as GPS sensors).

FIGS. 1C-D illustrate an example cargo vehicle 150, such as a tractor-trailer truck. The truck may include, e.g., a single, double or triple trailer, or may be another medium or heavy duty truck such as in commercial weight classes 4 through 8. As shown, the truck includes a tractor unit 152 and a single cargo unit or trailer 154. The trailer 154 may be fully enclosed, open such as a flat bed, or partially open depending on the type of cargo to be transported. In this example, the tractor unit 152 includes the engine and steering systems (not shown) and a cab 156 for a driver and any passengers.

The trailer 154 includes a hitching point, known as a kingpin, 158. The kingpin 158 is typically formed as a solid steel shaft, which is configured to pivotally attach to the tractor unit 152. In particular, the kingpin 158 attaches to a trailer coupling 160, known as a fifth-wheel, that is mounted rearward of the cab. For a double or triple tractor-trailer, the second and/or third trailers may have simple hitch connections to the leading trailer. Or, alternatively, each trailer may have its own kingpin. In this case, at least the first and second trailers could include a fifth-wheel type structure arranged to couple to the next trailer.

As shown, the tractor may have one or more sensor units 162, 164 disposed therealong. For instance, one or more sensor units 162 may be disposed on a roof or top portion of the cab 156, and one or more side sensor units 164 may be disposed on left and/or right sides of the cab 156. Sensor units may also be located along other regions of the cab 156, such as along the front bumper or hood area, in the rear of the cab, adjacent to the fifth-wheel, underneath the chassis, etc. The trailer 154 may also have one or more sensor units 166 disposed therealong, for instance along a side panel, front, rear, roof and/or undercarriage of the trailer 154.

As with the sensor units of the passenger vehicles of FIGS. 1A-B, each sensor unit of the cargo vehicle may include one or more sensors, such as lidar, radar, camera (e.g., optical or infrared), acoustical (e.g., microphone or sonar-type sensor), inertial (e.g., accelerometer, gyroscope, etc.) or other sensors (e.g., positioning sensors such as GPS sensors).

There are different degrees of autonomy that may occur for a self-driving vehicle operating in a partially or fully autonomous driving mode. The U.S. National Highway Traffic Safety Administration and the Society of Automotive Engineers have identified different levels to indicate how much, or how little, the vehicle controls the driving. For instance, Level 0 has no automation and the driver makes all driving-related decisions. The lowest semi-autonomous mode, Level 1, includes some drive assistance such as cruise control. At this level, the vehicle may operate in a strictly driver-information system without needing any automated control over the vehicle. Here, the vehicle's onboard sensors, relative positional knowledge between them, and a way for them to exchange data, can be employed to implement aspects of the technology as discussed herein. Level 2 has partial automation of certain driving operations, while Level 3 involves conditional automation that can enable a person in the driver's seat to take control as warranted. In contrast, Level 4 is a high automation level where the vehicle is able to drive without assistance in select conditions. And Level 5 is a fully autonomous mode in which the vehicle is able to drive without assistance in all situations. The architectures, components, systems and methods described herein can function in any of the semi or fully-autonomous modes, e.g., Levels 1-5, which are referred to herein as autonomous driving modes. Thus, reference to an autonomous driving mode includes both partial and full autonomy.

Figure 2:
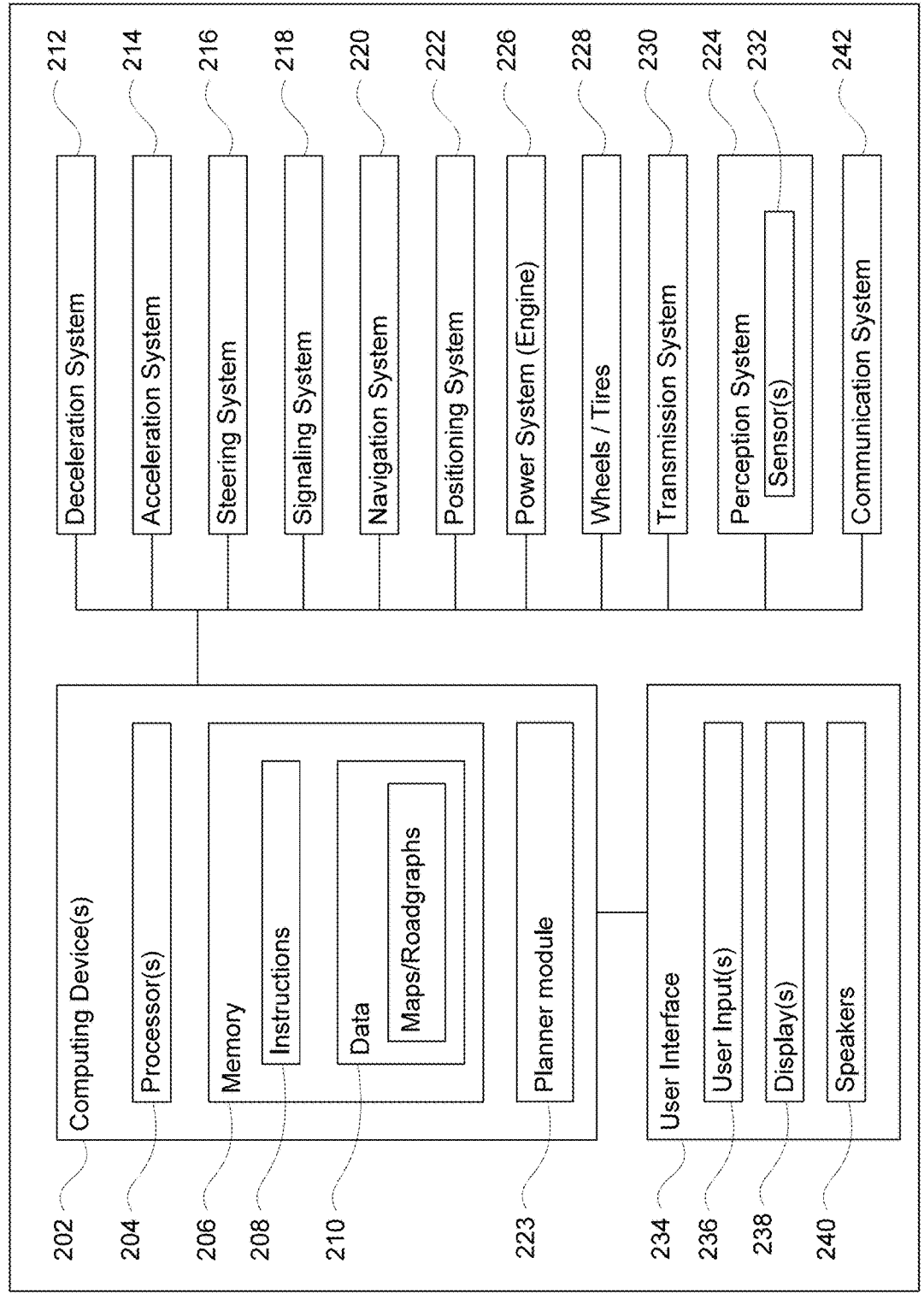
FIG. 2 illustrates components of a self-driving vehicle in accordance with aspects of the technology.

FIG. 2 illustrates a block diagram 200 with various components and systems of an exemplary vehicle, such as passenger vehicle 100 or 150, to operate in an autonomous driving mode. As shown, the block diagram 200 includes one or more computing devices 202, such as computing devices containing one or more processors 204, memory 206 and other components typically present in general purpose computing devices. The memory 206 stores information accessible by the one or more processors 204, including instructions 208 and data 210 that may be executed or otherwise used by the processor(s) 204. The computing system may control overall operation of the vehicle when operating in an autonomous driving mode.

The memory 206 stores information accessible by the processors 204, including instructions 208 and data 210 that may be executed or otherwise used by the processors 204. For instance, the memory may include illumination-related information to perform, e.g., occluded vehicle detection. The memory 206 may be of any type capable of storing information accessible by the processor, including a computing device-readable medium. The memory is a non-transitory medium such as a hard-drive, memory card, optical disk, solid-state, etc. Systems may include different combinations of the foregoing, whereby different portions of the instructions and data are stored on different types of media.

The instructions 208 may be any set of instructions to be executed directly (such as machine code) or indirectly (such as scripts) by the processor(s). For example, the instructions may be stored as computing device code on the computing device-readable medium. In that regard, the terms "instructions", "modules" and "programs" may be used interchangeably herein. The instructions may be stored in object code format for direct processing by the processor, or in any other computing device language including scripts or collections of independent source code modules that are interpreted on demand or compiled in advance. The data 210, such as map (e.g., roadgraph) information, may be retrieved, stored or modified by one or more processors 204 in accordance with the instructions 208. In one example, some or all of the memory 206 may be an event data recorder or other secure data storage system configured to store vehicle diagnostics and/or detected sensor data, which may be on board the vehicle or remote, depending on the implementation.

The processors 204 may be any conventional processors, such as commercially available CPUs. Alternatively, each processor may be a dedicated device such as an ASIC or other hardware-based processor. Although FIG. 2 functionally illustrates the processors, memory, and other elements of computing devices 202 as being within the same block, such devices may actually include multiple processors, computing devices, or memories that may or may not be stored within the same physical housing. Similarly, the memory 206 may be a hard drive or other storage media located in a housing different from that of the processor(s) 204. Accordingly, references to a processor or computing device will be understood to include references to a collection of processors or computing devices or memories that may or may not operate in parallel.

In one example, the computing devices 202 may form an autonomous driving computing system incorporated into vehicle 100. The autonomous driving computing system may be capable of communicating with various components of the vehicle. For example, the computing devices 202 may be in communication with various systems of the vehicle, including a driving system including a deceleration system 212 (for controlling braking of the vehicle), acceleration system 214 (for controlling acceleration of the vehicle), steering system 216 (for controlling the orientation of the wheels and direction of the vehicle), signaling system 218 (for controlling turn signals), navigation system 220 (for navigating the vehicle to a location or around objects) and a positioning system 222 (for determining the position of the vehicle, e.g., including the vehicle's pose, e.g., position and orientation along the roadway or pitch, yaw and roll of the vehicle chassis relative to a coordinate system). The autonomous driving computing system may employ a planner module 223, in accordance with the navigation system 220, the positioning system 222 and/or other components of the system, e.g., for determining a route from a starting point to a destination, for identifying a stop location at an intersection, or for making modifications to various driving aspects in view of current or expected traction conditions.

The computing devices 202 are also operatively coupled to a perception system 224 (for detecting objects in the vehicle's environment), a power system 226 (for example, a battery and/or gas or diesel powered engine) and a transmission system 230 in order to control the movement, speed, etc., of the vehicle in accordance with the instructions 208 of memory 206 in an autonomous driving mode which does not require or need continuous or periodic input from a passenger of the vehicle. Some or all of the wheels/tires 228 are coupled to the transmission system 230, and the computing devices 202 may be able to receive information about tire pressure, balance and other factors that may impact driving in an autonomous mode.

The computing devices 202 may control the direction and speed of the vehicle, e.g., via the planner module 223, by controlling various components. By way of example, computing devices 202 may navigate the vehicle to a destination location completely autonomously using data from map information and navigation system 220. Computing devices 202 may use the positioning system 222 to determine the vehicle's location and the perception system 224 to detect and respond to objects when needed to reach the location safely. In order to do so, computing devices 202 may cause the vehicle to accelerate (e.g., by increasing fuel or other energy provided to the engine by acceleration system 214), decelerate (e.g., by decreasing the fuel supplied to the engine, changing gears, and/or by applying brakes by deceleration system 212), change direction (e.g., by turning the front or other wheels of vehicle 100 by steering system 216), and signal such changes (e.g., by lighting turn signals of signaling system 218). Thus, the acceleration system 214 and deceleration system 212 may be a part of a drivetrain or other type of transmission system 230 that includes various components between an engine of the vehicle and the wheels of the vehicle. Again, by controlling these systems, computing devices 202 may also control the transmission system 230 of the vehicle in order to maneuver the vehicle autonomously.

Navigation system 220 may be used by computing devices 202 in order to determine and follow a route to a location. In this regard, the navigation system 220 and/or memory 206 may store map information, e.g., highly detailed maps that computing devices 202 can use to navigate or control the vehicle. While the map information may be image-based maps, the map information need not be entirely image based (for example, raster). For instance, the map information may include one or more roadgraphs, graph networks or road networks of information such as roads, lanes, intersections, and the connections between these features which may be represented by road segments. Each feature in the map may also be stored as graph data and may be associated with information such as a geographic location and whether or not it is linked to other related features, for example, a stop sign or road markings such as stop lines and crosswalks may be linked to a road and an intersection, etc. In some examples, the associated data may include grid-based indices of a road network to allow for efficient lookup of certain road network features.

In this regard, the map information may include a plurality of graph nodes and edges representing road or lane segments that together make up the road network of the map information. In this case, each edge may defined by a starting graph node having a specific geographic location (e.g. latitude, longitude, altitude, etc.), an ending graph node having a specific geographic location (e.g. latitude, longitude, altitude, etc.), and a direction. This direction may refer to a direction the vehicle must be moving in in order to follow the edge (i.e., a direction of traffic flow). The graph nodes may be located at fixed or variable distances. For instance, the spacing of the graph nodes may range from a few centimeters to a few meters and may correspond to the speed limit of a road on which the graph node is located. In this regard, greater speeds may correspond to greater distances between graph nodes.

Thus, the maps may identify the shape and elevation of roadways, lane markers, intersections, stop lines, crosswalks, speed limits, traffic signal lights, buildings, signs, real time traffic information, vegetation, or other such objects and information. The lane markers may include features such as solid or broken double or single lane lines, solid or broken lane lines, reflectors, etc. A given lane may be associated with left and/or right lane lines or other lane markers that define the boundary of the lane. Thus, most lanes may be bounded by a left edge of one lane line and a right edge of another lane line.

The perception system 224 includes sensors 232 for detecting objects external to the vehicle. The detected objects may be other vehicles, obstacles in the roadway, traffic signals, signs, road markings (e.g., crosswalks and stop lines), objects adjacent to the roadway such as sidewalks, trees or shrubbery, etc. The sensors may 232 may also detect certain aspects of weather conditions, such as snow, rain or water spray, or puddles, ice or other materials on the roadway.

By way of example only, the sensors of the perception system may include light detection and ranging (lidar) sensors, radar units, cameras (e.g., optical imaging devices, with or without a neutral-density filter (ND) filter), positioning sensors (e.g., gyroscopes, accelerometers and/or other inertial components), infrared sensors, and/or any other detection devices that record data which may be processed by computing devices 202. The perception system 224 may also include one or more microphones or other acoustical arrays, for instance arranged along the roof pod 102 and/or other sensor assembly housings.

Such sensors of the perception system 224 may detect objects outside of the vehicle and their characteristics such as location, orientation (pose) relative to the roadway, size, shape, type (for instance, vehicle, pedestrian, bicyclist, etc.), heading, speed of movement relative to the vehicle, etc., as well as environmental conditions around the vehicle. The perception system 224 may also include other sensors within the vehicle to detect objects and conditions within the vehicle, such as in the passenger compartment. For instance, such sensors may detect, e.g., one or more persons, pets, packages, etc., as well as conditions within and/or outside the vehicle such as temperature, humidity, etc. Still further sensors 232 of the perception system 224 may measure the rate of rotation of the wheels 228, an amount or a type of braking by the deceleration system 212, and other factors associated with the equipment of the vehicle itself.

The raw data obtained by the sensors can be processed by the perception system 224 and/or sent for further processing to the computing devices 202 periodically or continuously as the data is generated by the perception system 224. Computing devices 202 may use the positioning system 222 to determine the vehicle's location and perception system 224 to detect and respond to objects and roadway information (e.g., signage or road markings) when needed to reach the location safely, e.g., via adjustments made by planner module 223, including adjustments in operation to deal with occlusions and other issues.

As illustrated in FIGS. 1A-B, certain sensors of the perception system 224 may be incorporated into one or more sensor assemblies or housings. In one example, these may be integrated into front, rear or side perimeter sensor assemblies around the vehicle. In another example, other sensors may be part of the roof-top housing (roof pod) 102. The computing devices 202 may communicate with the sensor assemblies located on or otherwise distributed along the vehicle. Each assembly may have one or more types of sensors such as those described above.

Returning to FIG. 2, computing devices 202 may include all of the components normally used in connection with a computing device such as the processor and memory described above as well as a user interface subsystem 234. The user interface subsystem 234 may include one or more user inputs 236 (e.g., a mouse, keyboard, touch screen and/or microphone) and one or more display devices 238 (e.g., a monitor having a screen or any other electrical device that is operable to display information). In this regard, an internal electronic display may be located within a cabin of the vehicle (not shown) and may be used by computing devices 202 to provide information to passengers within the vehicle. Other output devices, such as speaker(s) 240 may also be located within the passenger vehicle to provide information to riders, or to communicate with users or other people outside the vehicle.

The vehicle may also include a communication system 242. For instance, the communication system 242 may also include one or more wireless configurations to facilitate communication with other computing devices, such as passenger computing devices within the vehicle, computing devices external to the vehicle such as in other nearby vehicles on the roadway, and/or a remote server system. The network connections may include short range communication protocols such as Bluetooth™, Bluetooth™ low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Figure 3A:
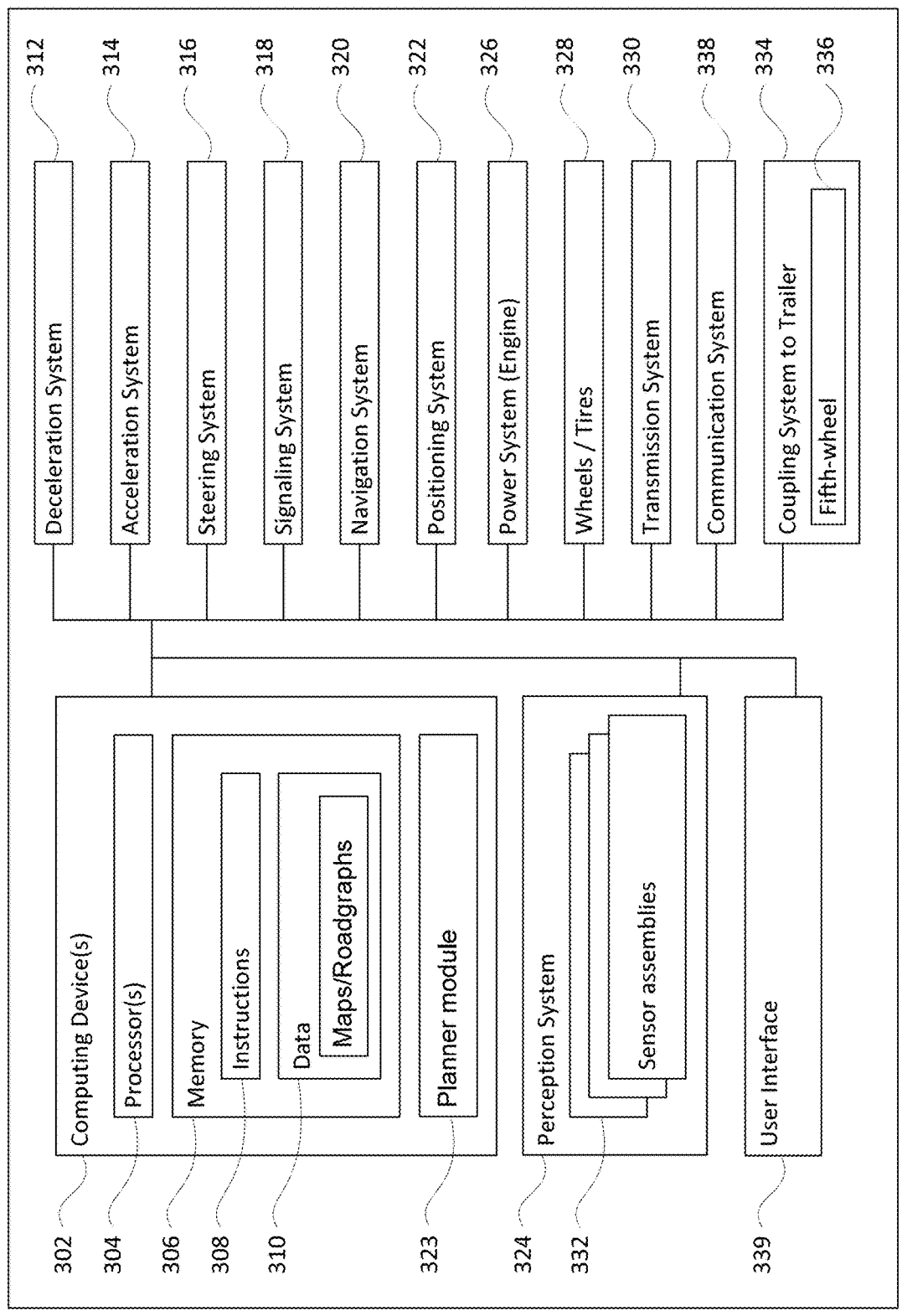
FIGS. 3A-B are block diagrams of systems of an example cargo-type vehicle in accordance with aspects of the technology.

FIG. 3A illustrates a block diagram 300 with various components and systems of a vehicle, e.g., vehicle 150 of FIGS. 1C-D. By way of example, the vehicle may be a truck, farm equipment or construction equipment, configured to operate in one or more autonomous modes of operation. As shown in the block diagram 300, the vehicle includes a control system of one or more computing devices, such as computing devices 302 containing one or more processors 304, memory 306 and other components similar or equivalent to components 202, 204 and 206 discussed above with regard to FIG. 2. For instance, the data may include map-related information (e.g., roadgraphs) to perform a stop line determination.

The control system may constitute an electronic control unit (ECU) of a tractor unit of a cargo vehicle. As with instructions 208, the instructions 308 may be any set of instructions to be executed directly (such as machine code) or indirectly (such as scripts) by the processor. Similarly, the data 310 may be retrieved, stored or modified by one or more processors 304 in accordance with the instructions 308.

In one example, the computing devices 302 may form an autonomous driving computing system incorporated into vehicle 150. Similar to the arrangement discussed above regarding FIG. 2, the autonomous driving computing system of block diagram 300 may be capable of communicating with various components of the vehicle in order to perform route planning and driving operations. For example, the computing devices 302 may be in communication with various systems of the vehicle, such as a driving system including a deceleration system 312, acceleration system 314, steering system 316, signaling system 318, navigation system 320 and a positioning system 322, each of which may function as discussed above regarding FIG. 2.

The computing devices 302 are also operatively coupled to a perception system 324, a power system 326 and a transmission system 330. Some or all of the wheels/tires 228 are coupled to the transmission system 230, and the computing devices 202 may be able to receive information about tire pressure, balance, rotation rate and other factors that may impact driving in an autonomous mode. As with computing devices 202, the computing devices 302 may control the direction and speed of the vehicle by controlling various components. By way of example, computing devices 302 may navigate the vehicle to a destination location completely autonomously using data from the map information and navigation system 320. Computing devices 302 may employ a planner module 323, in conjunction with the positioning system 322, the perception system 324 and other subsystems to detect and respond to objects when needed to reach the location safely, similar to the manner described above for FIG. 2.

Similar to perception system 224, the perception system 324 also includes one or more sensors or other components such as those described above for detecting objects external to the vehicle, objects or conditions internal to the vehicle, and/or operation of certain vehicle equipment such as the wheels and deceleration system 312. For instance, as indicated in FIG. 3A the perception system 324 includes one or more sensor assemblies 332. Each sensor assembly 232 includes one or more sensors. In one example, the sensor assemblies 332 may be arranged as sensor towers integrated into the side-view mirrors on the truck, farm equipment, construction equipment or the like. Sensor assemblies 332 may also be positioned at different locations on the tractor unit 152 or on the trailer 154, as noted above with regard to FIGS. 1C-D. The computing devices 302 may communicate with the sensor assemblies located on both the tractor unit 152 and the trailer 154. Each assembly may have one or more types of sensors such as those described above.

Also shown in FIG. 3A is a coupling system 334 for connectivity between the tractor unit and the trailer. The coupling system 334 may include one or more power and/or pneumatic connections (not shown), and a fifth-wheel 336 at the tractor unit for connection to the kingpin at the trailer. A communication system 338, equivalent to communication system 242, is also shown as part of vehicle system 300.

Similar to FIG. 2, in this example the cargo truck or other vehicle may also include a user interface subsystem 339. The user interface subsystem 339 may be located within the cabin of the vehicle and may be used by computing devices 202 to provide information to passengers within the vehicle, such as a truck driver who is capable of driving the truck in a manual driving mode.

Figure 3B:
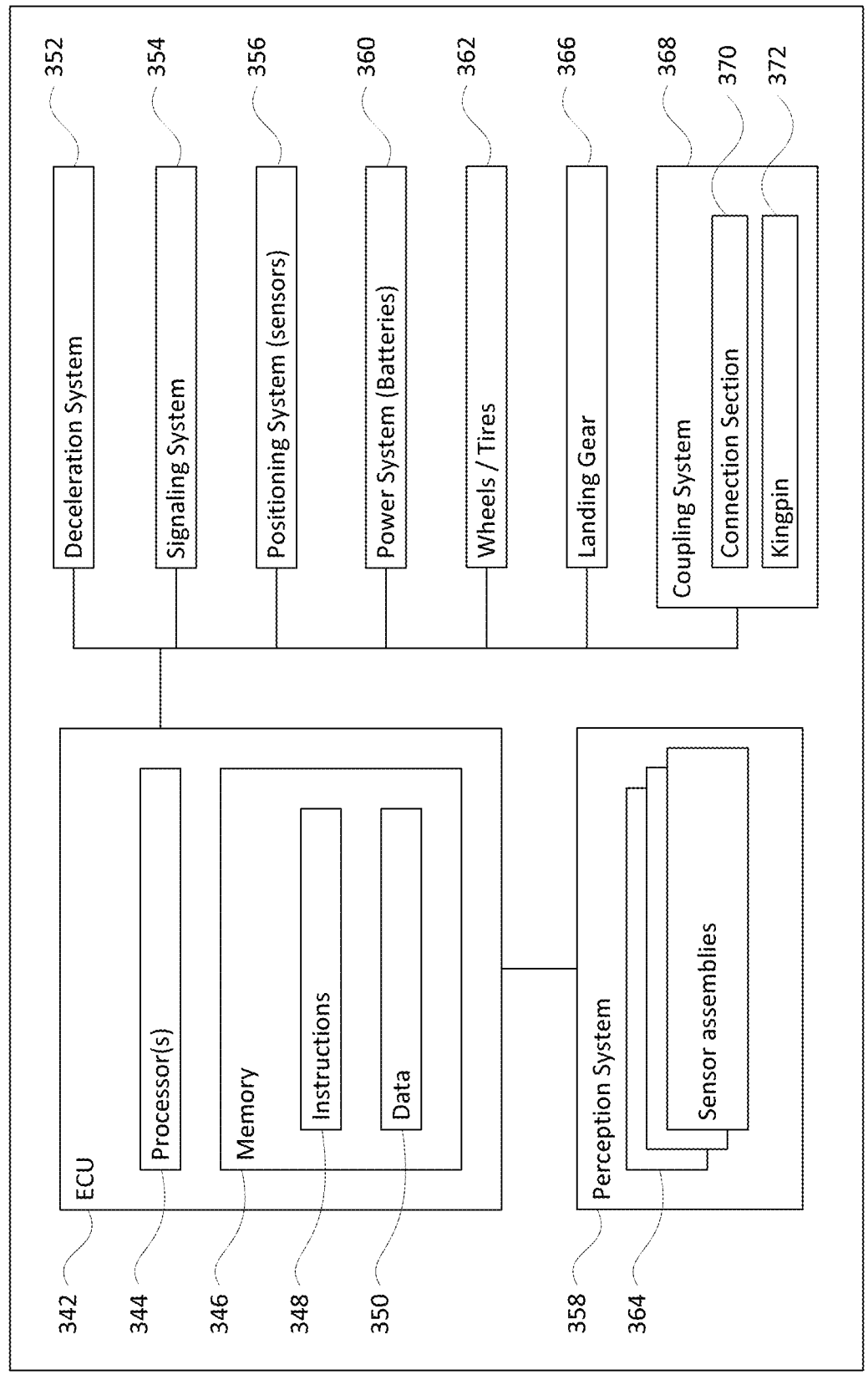

FIG. 3B illustrates an example block diagram 340 of systems of the trailer, such as trailer 154 of FIGS. 1C-D. As shown, the system includes an ECU 342 of one or more computing devices, such as computing devices containing one or more processors 344, memory 346 and other components typically present in general purpose computing devices. The memory 346 stores information accessible by the one or more processors 344, including instructions 348 and data 350 that may be executed or otherwise used by the processor(s) 344. The descriptions of the processors, memory, instructions and data from FIGS. 2 and 3A apply to these elements of FIG. 3B.

The ECU 342 is configured to receive information and control signals from the trailer unit. The on-board processors 344 of the ECU 342 may communicate with various systems of the trailer, including a deceleration system 352, signaling system 354, and a positioning system 356. The ECU 342 may also be operatively coupled to a perception system 358 with one or more sensors arranged in sensor assemblies 364 for detecting objects in the trailer's environment. The ECU 342 may also be operatively coupled with a power system 360 (for example, a battery power supply) to provide power to local components. Some or all of the wheels/tires 362 of the trailer may be coupled to the deceleration system 352, and the processors 344 may be able to receive information about tire pressure, balance, wheel speed and other factors that may impact driving in an autonomous mode, and to relay that information to the processing system of the tractor unit. The deceleration system 352, signaling system 354, positioning system 356, perception system 358, power system 360 and wheels/tires 362 may operate in a manner such as described above with regard to FIGS. 2 and 3A.

The trailer also includes a set of landing gear 366, as well as a coupling system 368. The landing gear may provide a support structure for the trailer when decoupled from the tractor unit. The coupling system 368, which may be a part of coupling system 334, provides connectivity between the trailer and the tractor unit. Thus, the coupling system 368 may include a connection section 370 (e.g., for communication, power and/or pneumatic links to the tractor unit). The coupling system also includes a kingpin 372 configured for connectivity with the fifth-wheel of the tractor unit.

Example Implementations

The stop location is the location where the self-driving vehicle should stop when detecting a stop sign (or a stop light, yield sign or other signage requiring vehicles to stop before proceeding through an intersection). FIGS. 4A-B illustrate two stop location scenarios. In particular, view 400 of FIG. 4A illustrates a "stop line" scenario showing a roadway 402 at which there is a stop sign 404 at the intersection. Here, stop line 406 is painted on the roadway 402. The roadway 402 may also include lane lines 408 and/or "STOP" text or another graphic 410 indicating that vehicles should come to a stop at the intersection. In this example, a separate crosswalk 412 is present, although in other examples the stop line may be part of or immediately adjacent to the crosswalk.

View 420 of FIG. 4B illustrates a "no stop line" scenario showing a roadway 422. Similar to the above example, a stop sign 424 (or other signage/signal) is located at the intersection. However, unlike the above example, there is no stop line on the roadway, and there may be no lane lines, road text or other indicia regarding where to stop. In this case, the vehicle may need to infer the stop location based on the shape of intersection/curb, as well as other relevant information (e.g., how other vehicles, or pedestrians or bicyclists act at the intersection).

Mapped Stop Line Locations

According to one aspect of the technology, in both types of stop line scenarios the system may predict an optimal stop point using relevant information from the environment. For both stop line and no stop line cases, the stop location may be mapped in a roadgraph (based on prior detection/determination).

Figure 5A:
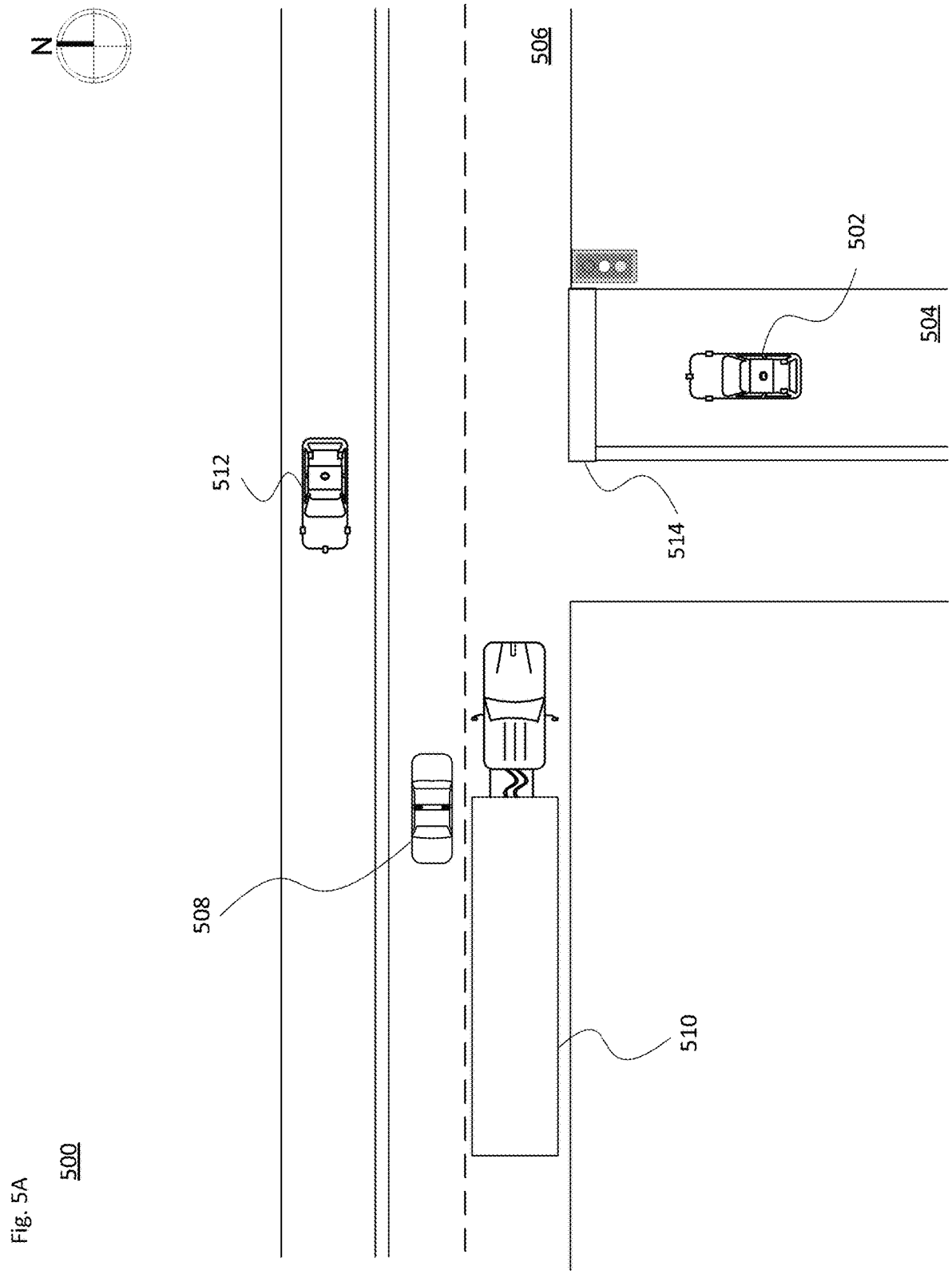

For stop line cases, the mapped stop point (stop location) should be aligned on the stop line. FIG. 5A illustrates a view 500 in which a self-driving vehicle 502 is on a road segment 504 which has a stop light at an intersection with road segment 506. Various other vehicles 508, 510 and 512 may be on the cross street road segment 506. In this example, stop line 514 is present on the road segment 504. FIG. 5B illustrates a view 520 showing placement of the mapped stop point which is, e.g., centered along the central portion of the stop line.

Figure 5C:
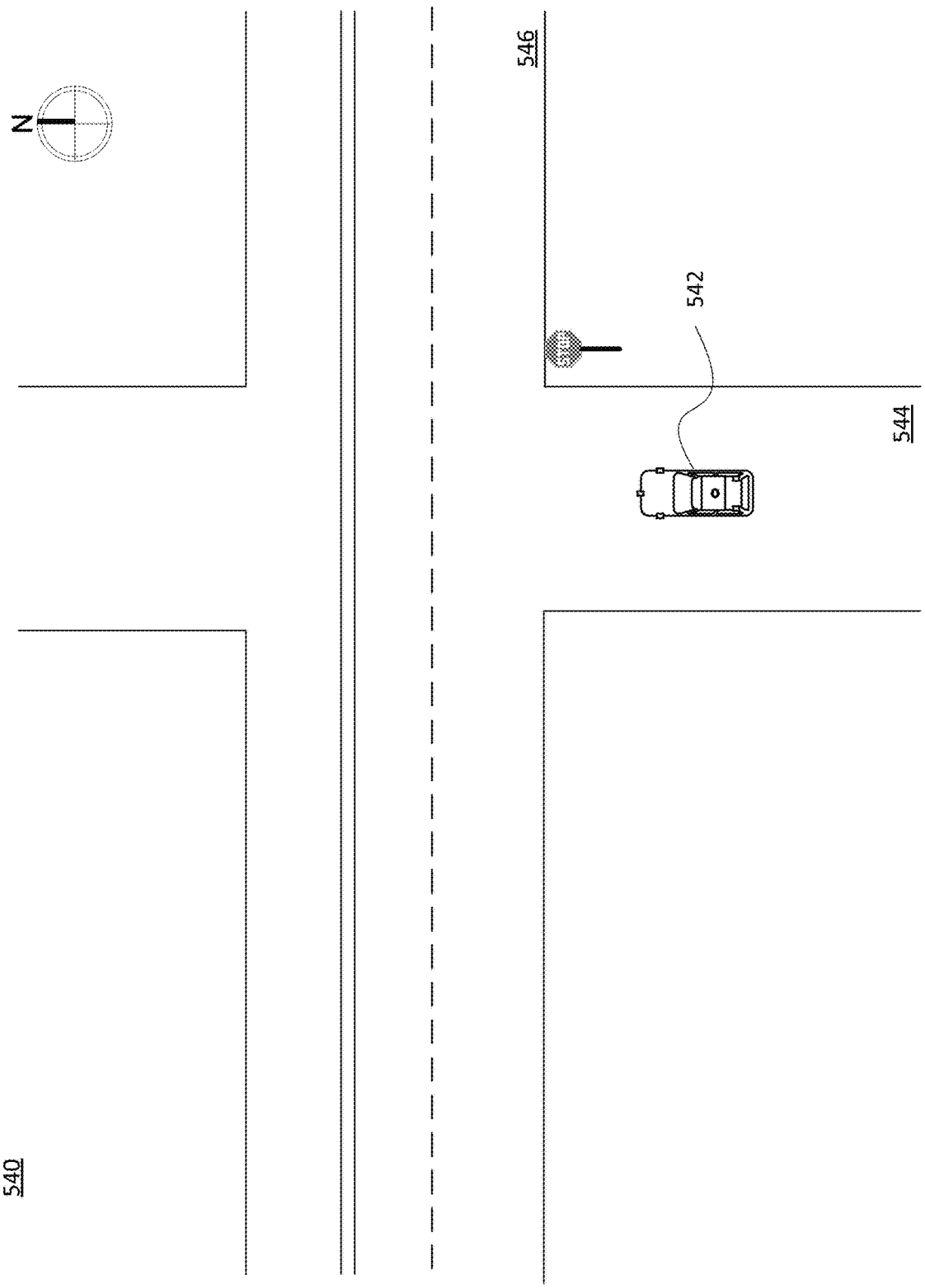
Figure 5D:
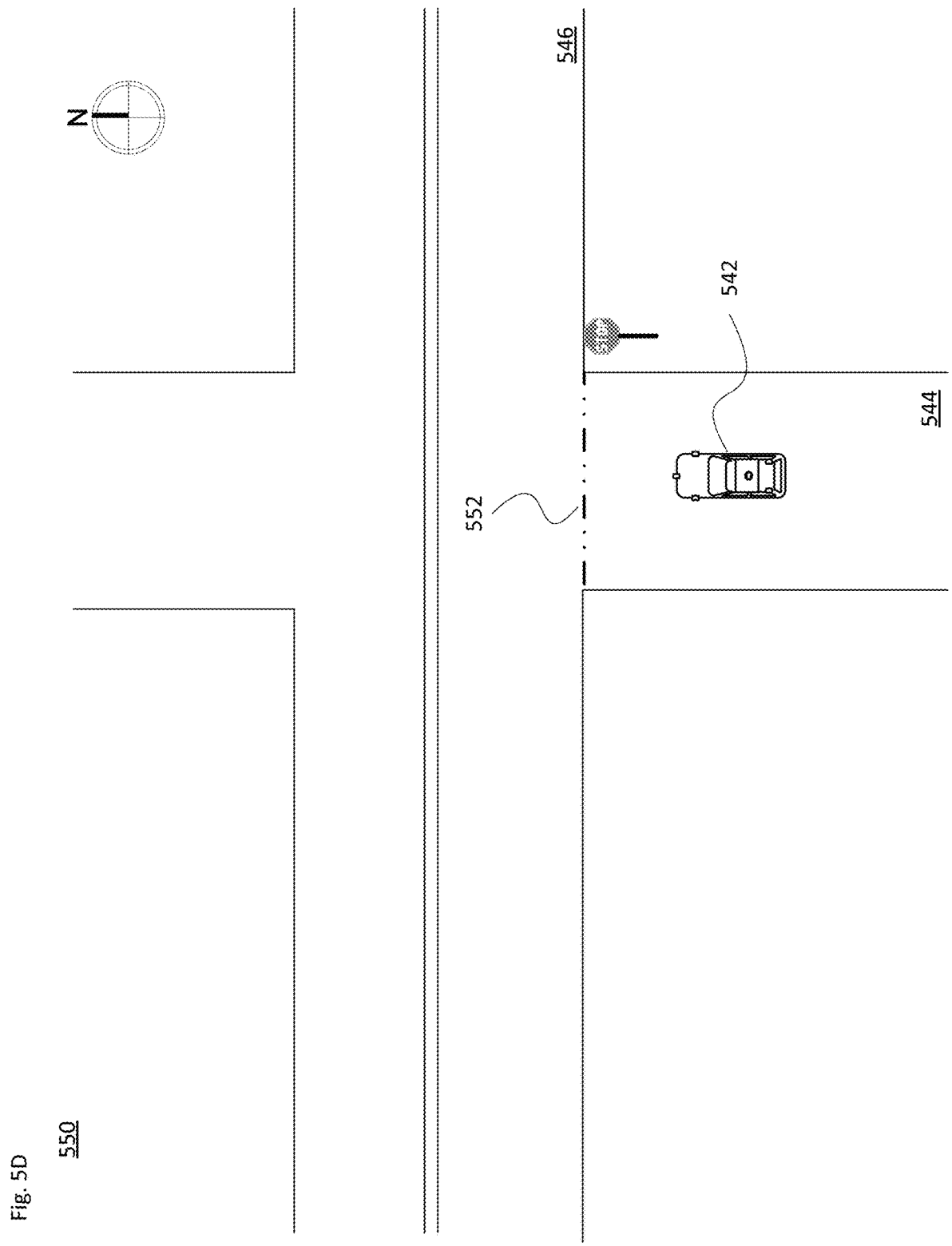
Figure 5E:
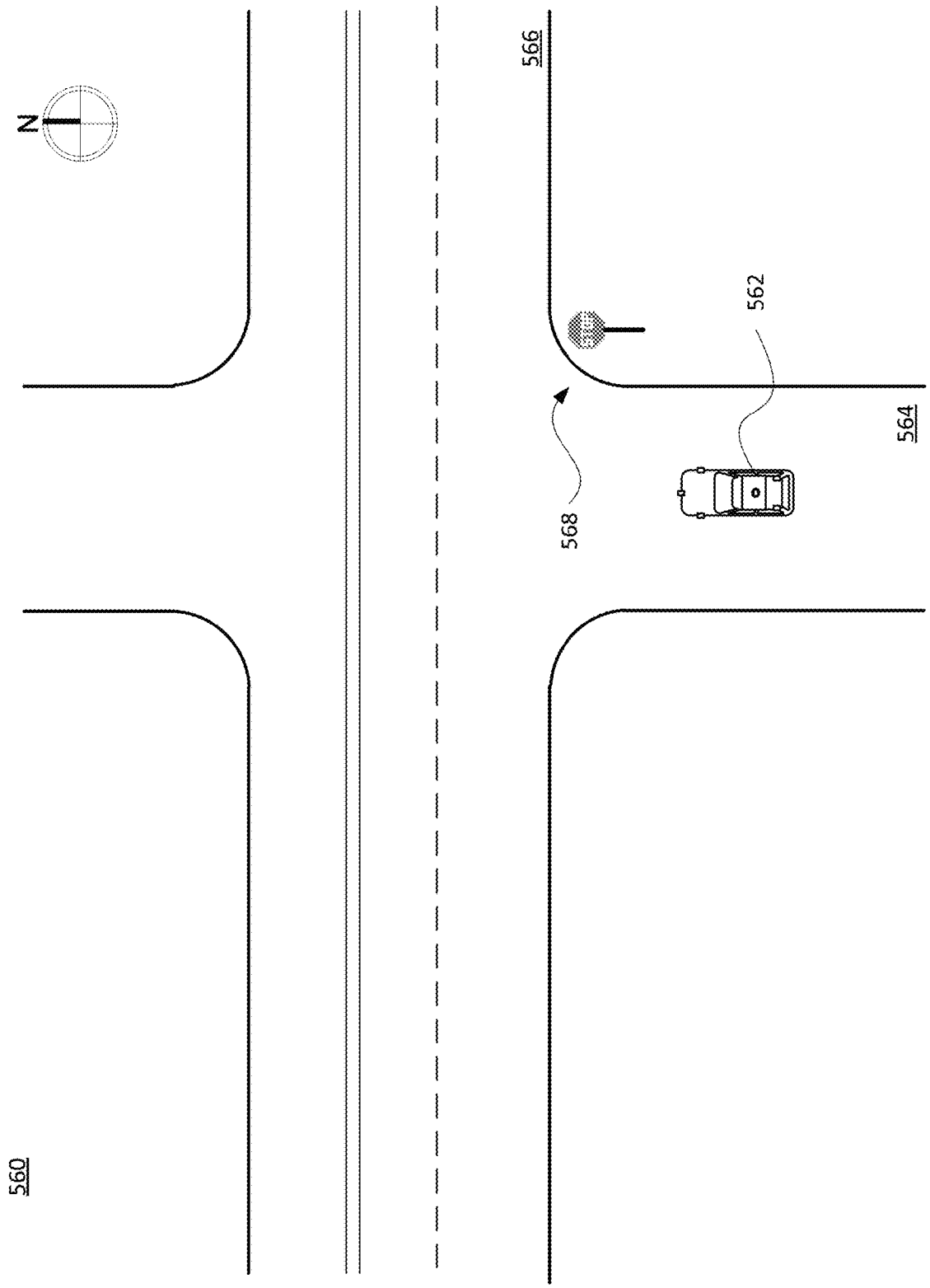

For no stop line cases, the mapped stop point (stop location) should be placed roughly at the middle of the area where road boundary curves for the intersection. If there is no curved portion, then the result is similar to that for the stop line case. For instance, FIG. 5C illustrates a view 540 showing a self-driving vehicle 542 on road segment 544, which is generally perpendicular to road segment 546. FIG. 5D illustrates a view 550, in which a stop location 552 is shown as being at the corner of the intersecting road segments. In contrast, as shown in view 560 of FIG. 5E, vehicle 562 is on road segment 564, which intersects with road segment 566. Here, intersection 568 is curved. As shown in view 570 of FIG. 5F, stop location 572 may be determined by identifying the end 574 of the road edge running parallel to the lane of road segment 564, and by identifying the end 576 of the curve. The stop location 572 may be calculated to be halfway between the end 574 and the end 576. However, it should be noted that depending on the vehicle (e.g., size, configuration, sensor placement, etc.) and any obstacles involving the intersection (e.g., buildings, mailboxes, signage, etc.), the stop location may be adjustable to provide a sufficient field of view (FOV) to detect vehicles and other oncoming objects at the intersection. For instance, view 580 of FIG. 5G shows the vehicle pulled past the calculated stop location 572 in order to have a FOV 582 that allows it to detect vehicle 582 even though there is an obstacle (e.g., a tree) at the intersection.

Regardless of whether it is a stop line or a no stop line situation, once the stop location is determined it is added to the map (e.g., as a layer in a roadgraph). The map may be updated by a vehicle, or by a back-end processing system. For instance, in one example the map can be updated by the back-end system, and in another example the vehicle could also (or alternatively) publish messages that effectively update the roadgraph. The mapped stop location information is then used by the vehicle (or a fleet of vehicles) during autonomous driving.

However, when the roadgraph information is out of date and does not match what is detected by the vehicle's sensors (or does not exist), a "change" is determined to have occurred. In one example for a situation having a stop line, it may be determined that there is a change when the mapped stop point is further than 1 meter to the actual stop point or more or less (e.g., as detected by a vehicle's onboard sensors). And in an example for a situation without a stop line, a change may be determined to occur when the mapped stop point is not inside the middle 30% of the curved zone (at the corner of the intersection). By detecting stop location changes and updating the map accordingly, the system can ensure correct driving behaviors around stop signs (or other stopping scenarios), and reduce the likelihood of situations such as rolling over stop lines or stopping in the intersection.

Detecting Stop Locations

According to one aspect of the technology, a neural network such as a convolutional neural network (CNN) is employed to detect road boundaries and features such as stop locations. In one scenario, the network is a fully convolutional neural network that takes top-down laser and camera images as sensor data input and produces "heatmap channels" for various road features, such as lanes, curbs, crosswalks, etc. The top-down laser images are created by aggregating lidar point clouds from vehicle sensor assemblies into a grid, and the top-down camera image is created by projecting lidar points into camera frame and sampling color values. This information is used to predict road features. For instance, the laser may be projected onto a grid of cells. The average intensity of light in each cell is measured. Other properties may also be measured, such as the minimum and/or maximum intensity of the laser, return information, pulse elongation, whether the return is a first or second return, etc.

Figure 6A:
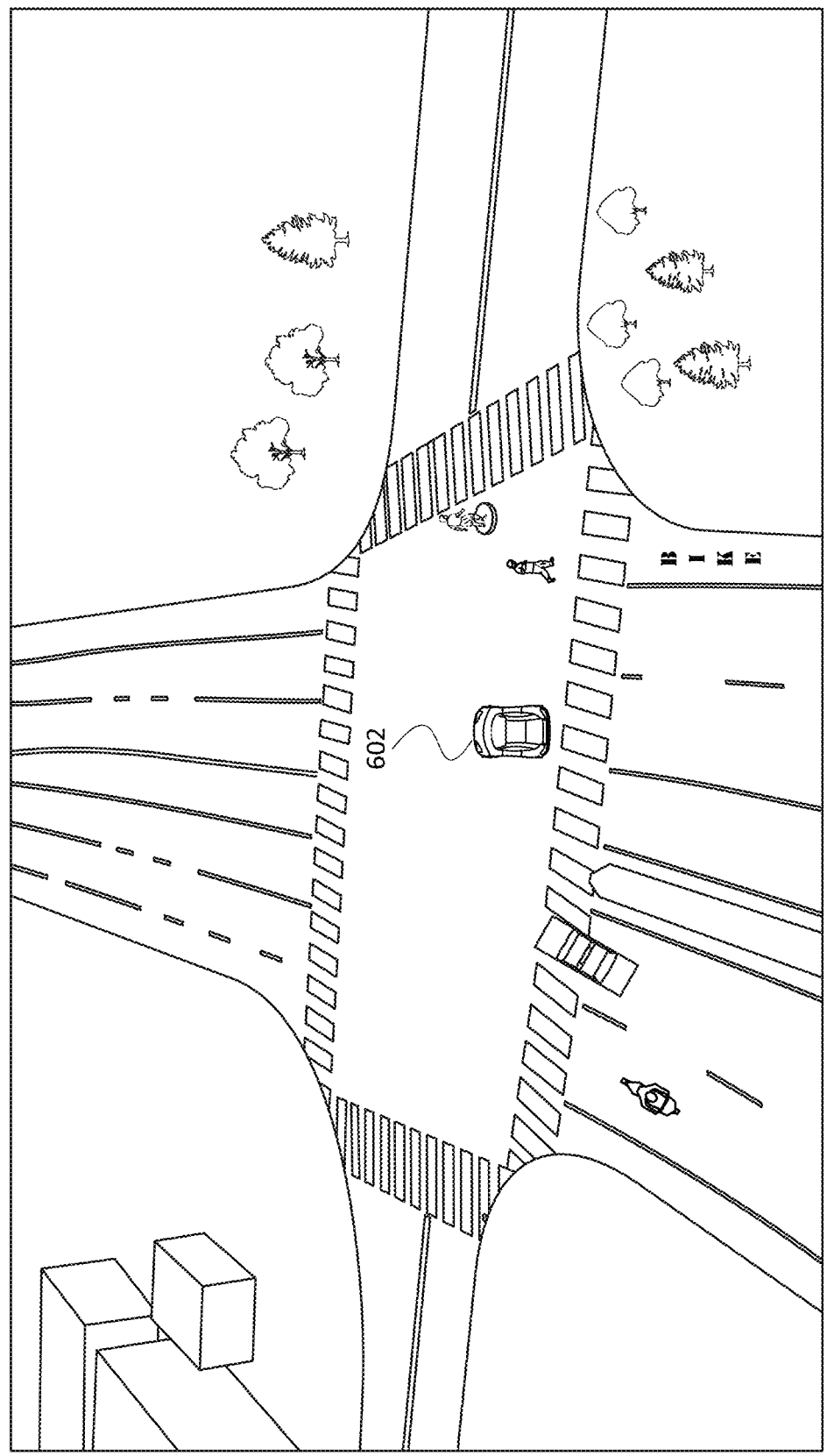
FIGS. 6A-B illustrate an example of detecting road features in accordance with aspects of the technology.
Figure 6B:
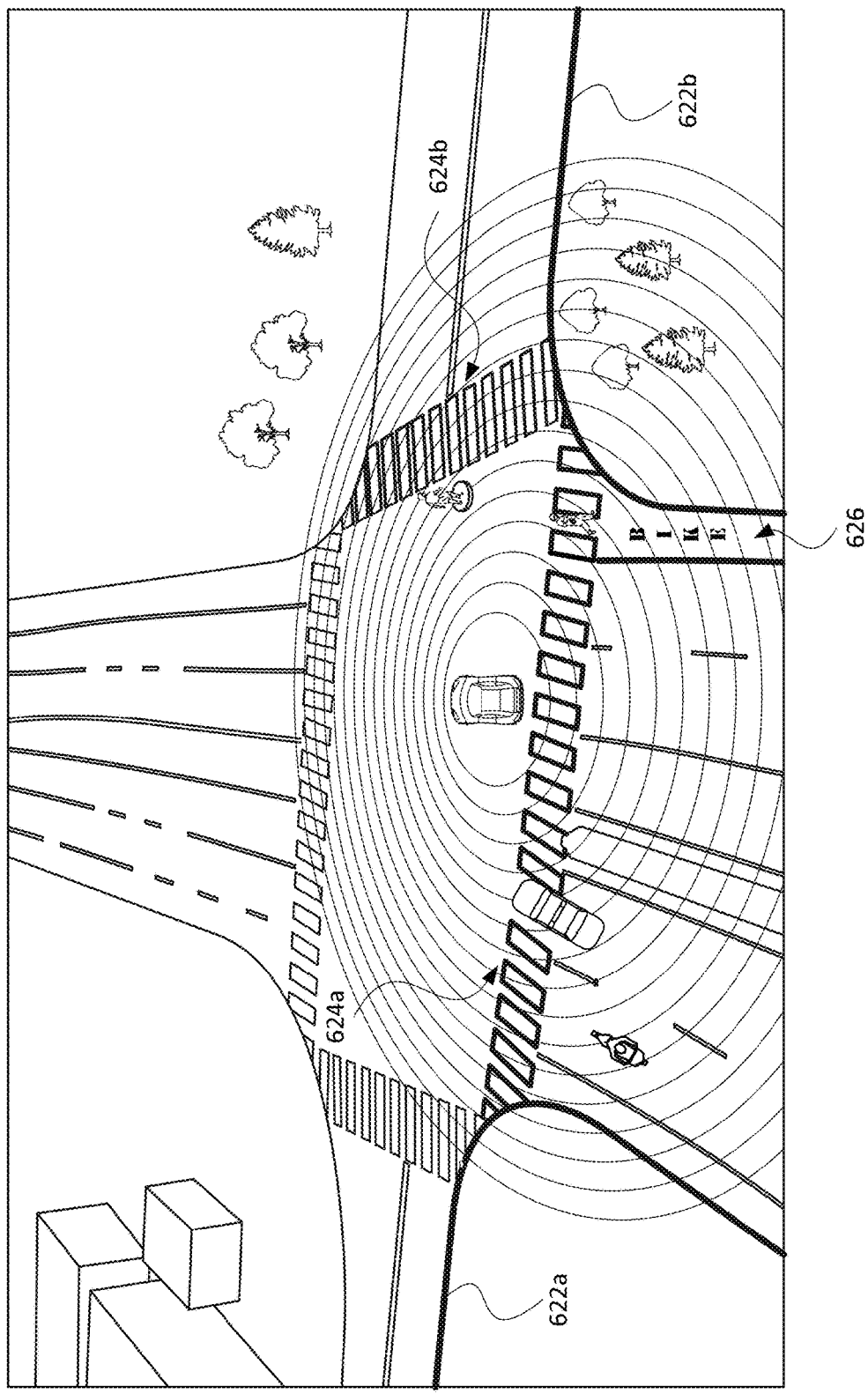

FIG. 6A illustrates a view 600 showing a self-driving vehicle 602 in an intersection of a roadway. As can be seen in this view, there is a 4-way intersection with crosswalks between opposing corners, as well as a bike lane. FIG. 6B illustrates another view 620 in which lidar signals (shown as concentric circles around the vehicle 602) are used in conjunction with camera images to produce heatmap channels. In this view, the lines of curbs 622a-b, crosswalks 624a-b and bike lane 626 are bolded to indicate the heatmap channels.

The neural network takes the grid information as sensor data input, including the lidar and associated color information. This input information is used for additional channels employed by the neural network to determine stop locations. The same approach may be used for both the stop line and no stop line situations. These additional channels include a classification channel, a localization channel, and an uncertainty estimation channel.

Figure 7A:
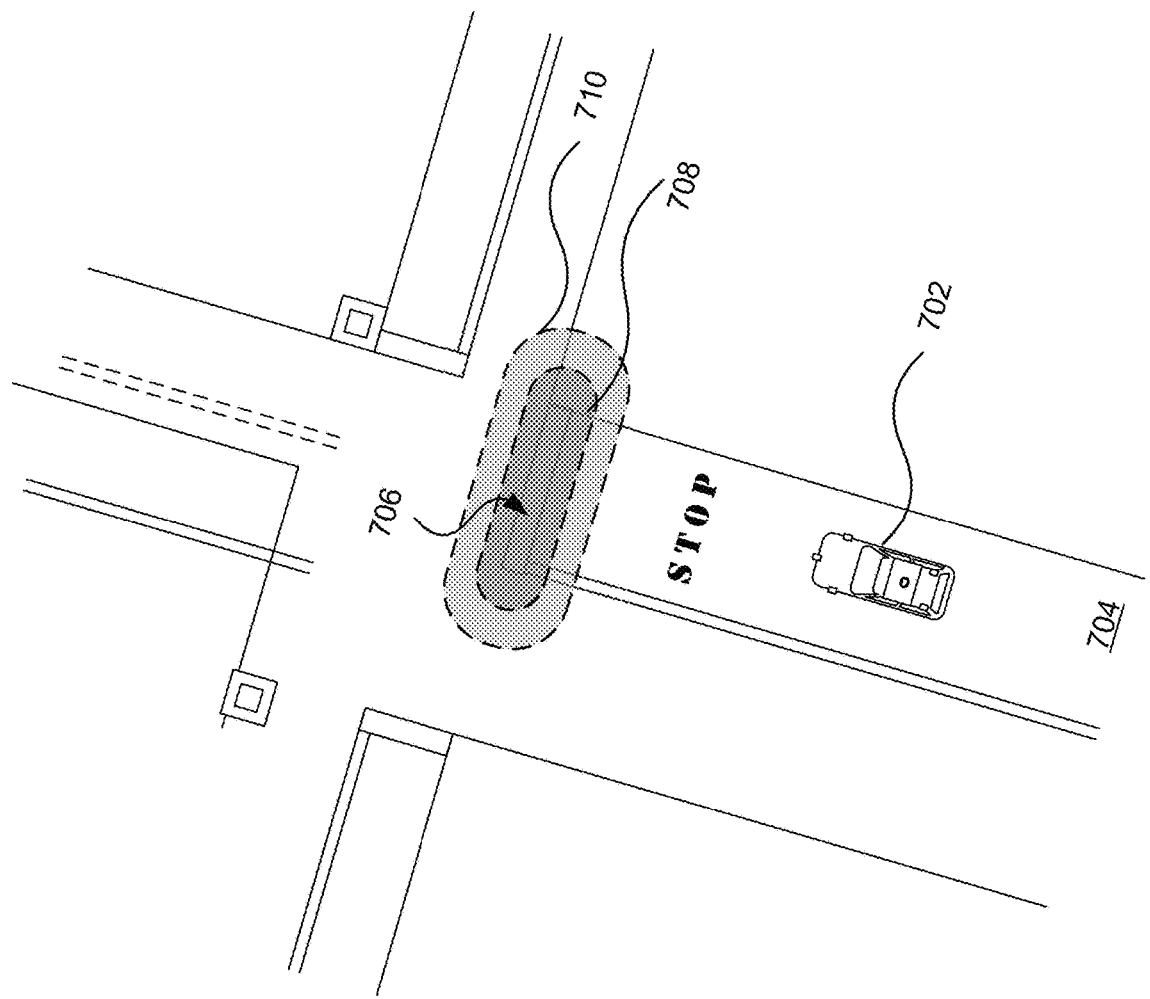
FIGS. 7A-D illustrate a set of channels in accordance with aspects of the technology.

The classification channel evaluates whether a pixel in the sensor data is near a stop line. FIG. 7A illustrates a view 700 in which a vehicle 702 is on road segment 704. The road segment 704 has a stop line 706. The classification channel is a binary classification channel (e.g., a yes/no or true/false evaluation) that generates a probability heatmap indicative of whether there is a stop line nearby. In the no stop line situation, the system determines the stop locations via the shape of the intersection and other detected roadgraph features.

Figure 7B:
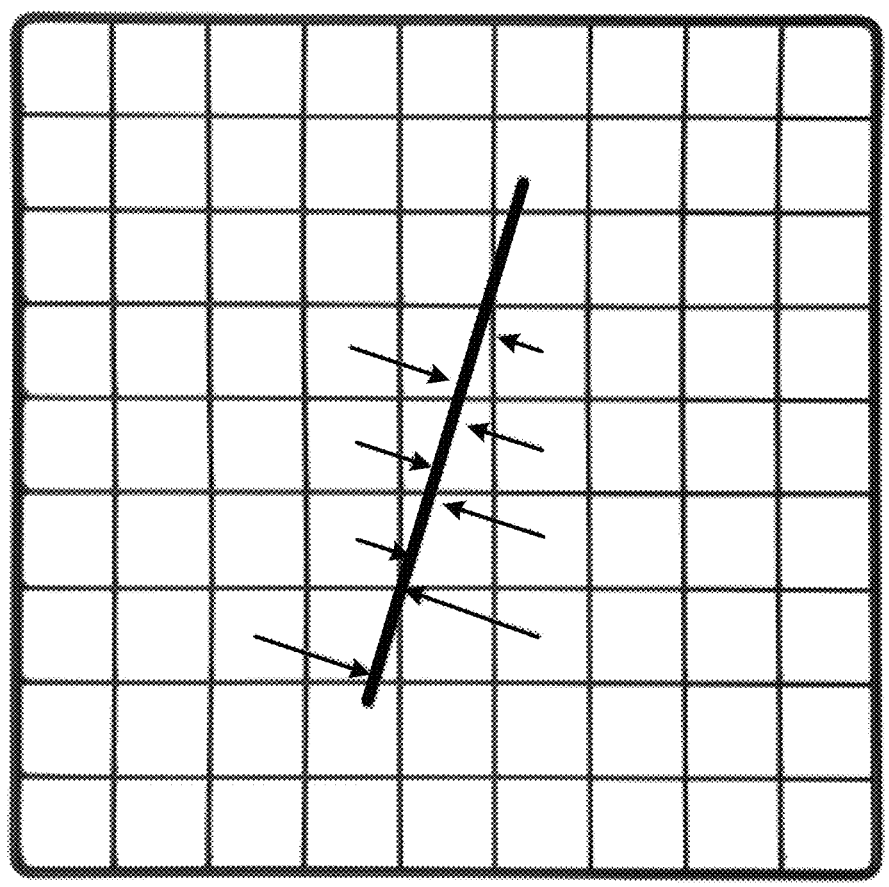

View 700 of FIG. 7A indicates two regions around the stop line 706, in particular a first (inner) region 708 and a second (outer) region 710 encircling the first region 708. View 720 of FIG. 7B illustrates an example of vectors relative to nearest points on the stop line. In one scenario, if the length of that vector is less than 1 m, the pixel would fall within the first region 708 and be labeled as positive during training of the neural network. If the length is more than 2 m, it would fall outside the second region and be labeled as negative. In between is the second region, which acts as a 1-meter "ignore" band to avoid confusing the CNN during training when evaluating boundary pixels.

Figure 7C:
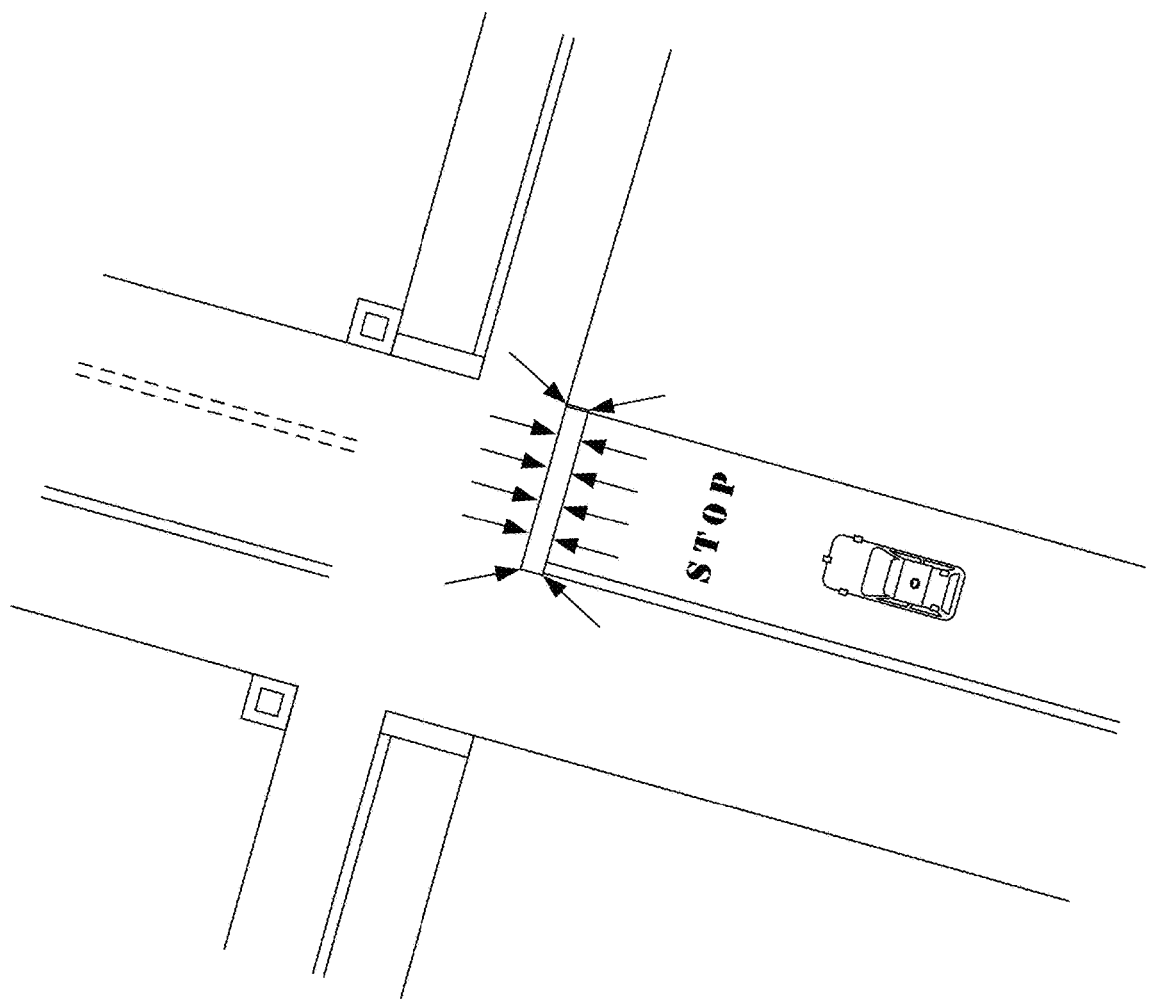

The localization channel is a regression channel used to determine where the closest point is on the stop line for each pixel, for the set of pixels that fall within the second region. The localization channel points in the direction of the stop line (if one exists). In particular, for each pixel in the output map, a vector is drawn pointing to its nearest point on the stop line. FIG. 7C illustrates a view 740 showing a vector field resulting from this channel. In particular, for each pixel in the output map, a vector is drawn pointing to its nearest point on the stop line. If the length of that vector is less than 2 m (based on the scenario from FIG. 7A), the target for this pixel would be this vector, otherwise it is ignored. The vector field being trained on is wider than the first (inner) region in order to obtain a valid regression vector for every pixel with high enough classification score.

Figure 7D:
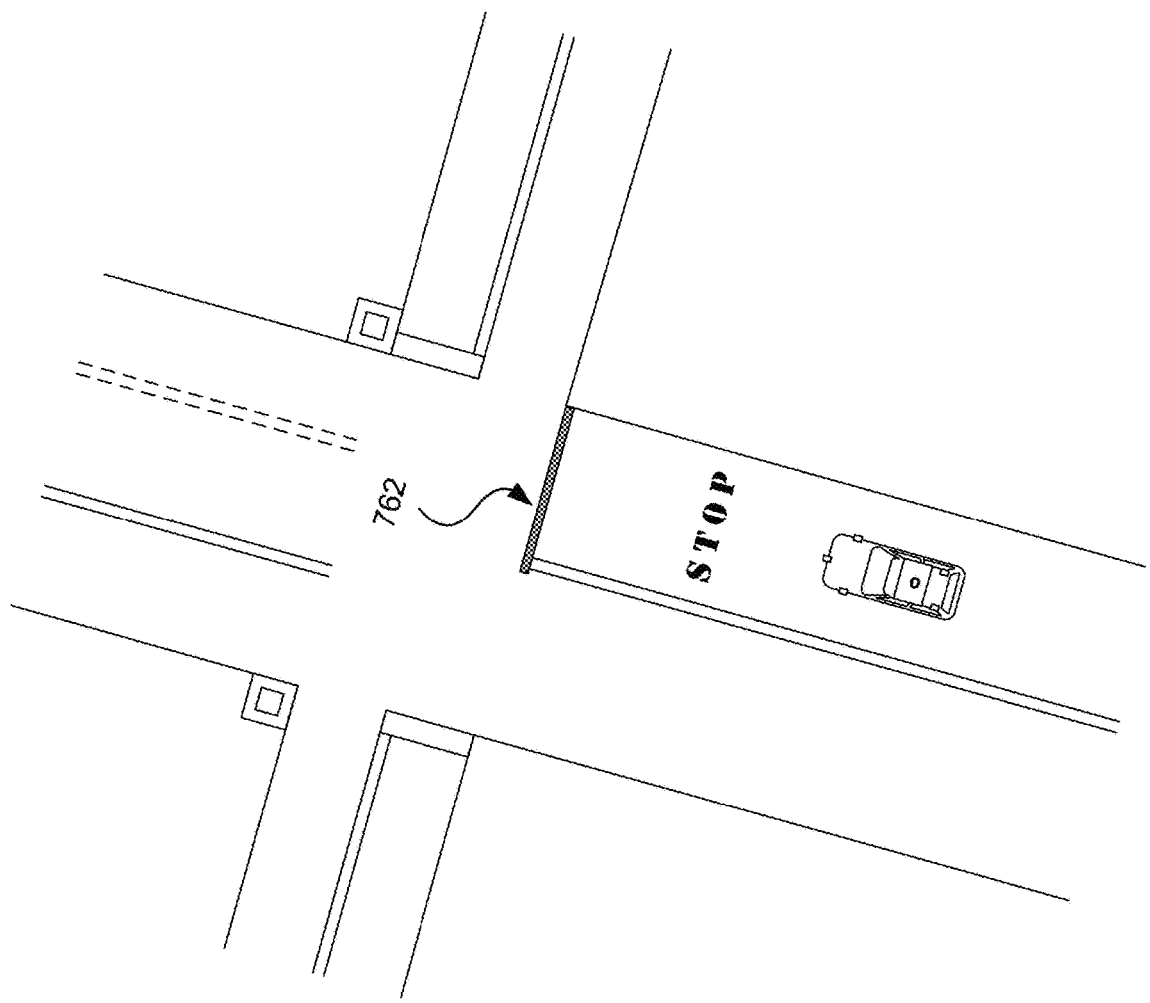

The uncertainty estimation channel is trained in a way such that it encodes a distribution of stop locations. In other words, this channel evaluates how uncertain the CNN is about a predicted stop location. The CNN will have different uncertainty about stop locations for the stop line and no stop line cases. However, by being aware of that the CNN can effectively apply adaptive distance thresholds to the two cases. The threshold may be applied in the post-processing for the CNN. According to the example shown in view 760 of FIG. 7D, the label for this channel is a very thin (e.g., 1 pixel wide) version of that of the classification channel, without the outer region, illustrated as 762.

In some implementations, there may be no explicit annotation of line segment representations of stop lines in the roadgraph. In this situation, using a set of heuristics, acceptably accurate line segment labels can be obtained automatically. For example, a lane endpoint associated with a stop sign (e.g., a stop sign is located adjacent to the lane endpoint and is used to control stopping of vehicles in that lane segment) may be on a stop line. Stop line orientation can be inferred from the nearby edge of the intersection polygon. If there is no such an edge nearby, it may be assumed that the stop line is perpendicular with the lane tangent. In addition, the length of the stop line may be approximated by the lane width at the endpoint, which is stored in the roadgraph data. This process can be applied regardless of whether there is an actual stop line or not.

Figure 8B:
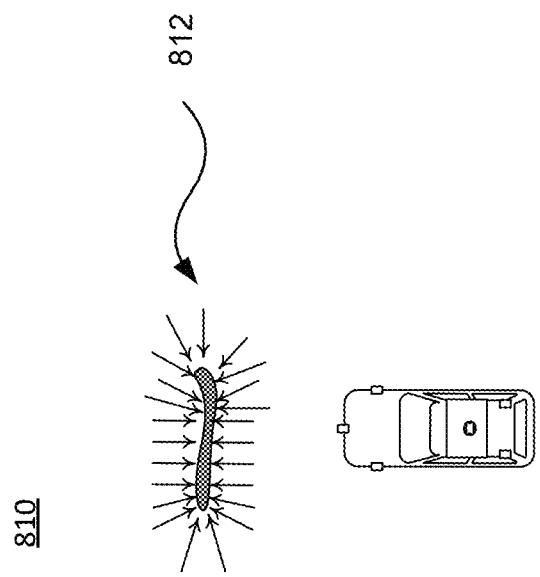
FIGS. 8A-B illustrate example training results in accordance with aspects of the technology.
Figure 8A:
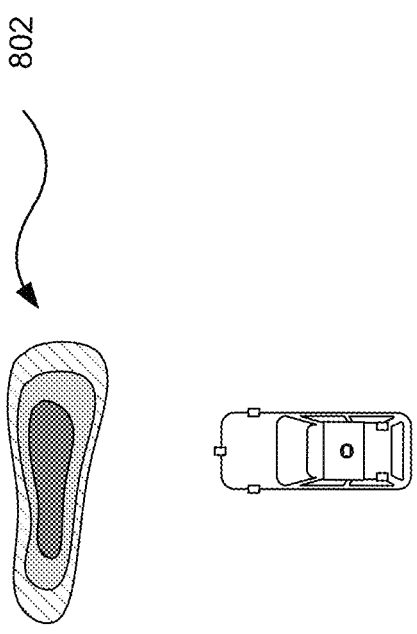

The training data for the network may include large sets (e.g., millions) of examples called "patch data". According to one scenario, the patch data comprises square crops with, e.g., 75 meters size around the vehicle with 0.25 m/pixel resolution. The patch data may contain laser and camera data together with all the labels the net needs within that region. The patch data may be extracted from days, weeks, months or years' worth of data. Stop line tasks may be trained jointly with one or more other tasks. As shown in views 800 and 810 of FIGS. 8A and 8b, respectively, the result includes a predicted heat map 802 (after training) for the stop location, and may include a predicted vector field 812.

Change Detection

Change detection may be performed in different ways. One way involves using a fixed threshold. In this method, a fixed threshold is set on an absolute distance of the stop location change. Due to the large variance and high error tolerance of no stop line cases, this approach may not be suitable for detecting change for both stop line and no stop line cases at the same time. Therefore, in one scenario, the system can use a simple paint classifier to first filter out most of the no stop line cases, and use a fixed threshold to only detect for stop line changes. FIG. 9 illustrates an example 900 of paint classification, which shows a bounding box (region of interest) 902 drawn around a portion of the detected stop location. The paint score for pixels within region 902 is used to decide whether it is a stop line case or a no stop line case. For instance, the brightness (Br) of a pixel may be defined as: $Br=(R+G+B)/3+laser\ intensity$. Then the paint score would be the standard deviation of Br for a given pixel in the region of interest.

Another approach is uncertainty-aware change detection. In this approach, the information from the network is evaluated both for the stop location and its uncertainty about the stop location. For instance, the network will output a distribution of stop locations. The likelihood of the mapped stop location is evaluated from that distribution. If the likelihood is too low, a change will be flagged.

Distribution information for stop locations may be evaluated as follows. As noted above, the uncertainty estimation channel has as its label a very thin line of "positive" pixels (pixels that are on the stop location). For instance, the classification channel outputs a number (value) per pixel. The neural network may be trained to output 0 for some pixels, and 1 for other pixels. It may not be able to do this perfectly, so it may predict something in between, usually close to the desired value. Thus, positive pixels are the pixels that the net has been taught to predict as 1. In this case it may be told to predict 1 only for those pixels right on the center of the stop line, and 0 everywhere else. In most instances, the CNN should produce a thinner and sharper heatmap for stop line cases while producing a wider and blurrier heatmap for no stop line cases. FIG. 10A illustrates a view 1000 showing a pixel distribution 1002 for a stop line case having a heat map of locations 1004, while FIG. 10B illustrates a view 1010 showing a pixel distribution 1012 for a no stop line case having a heat map of locations 1014.

Figure 11A:
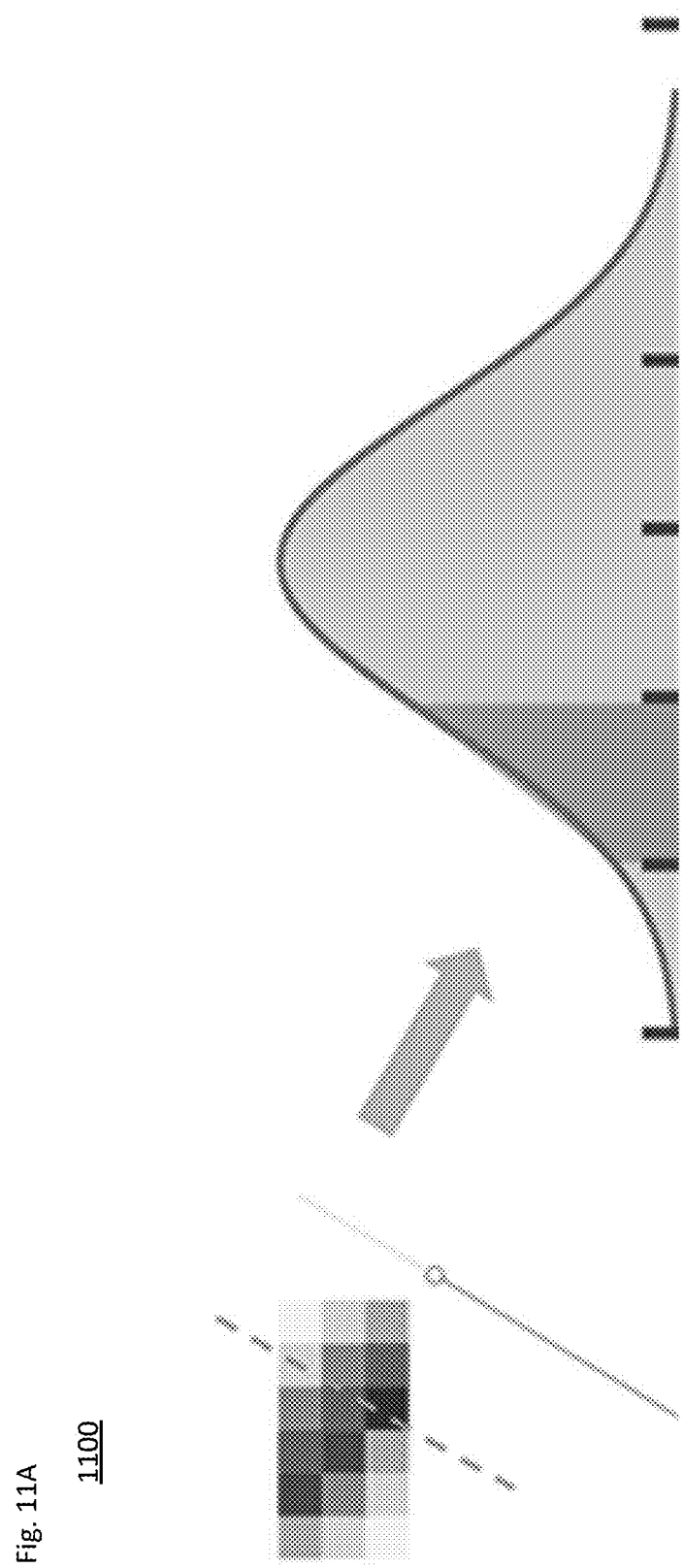
FIGS. 11A-F illustrate aspects of localization uncertainty in accordance with aspects of the technology.
Figure 11B:
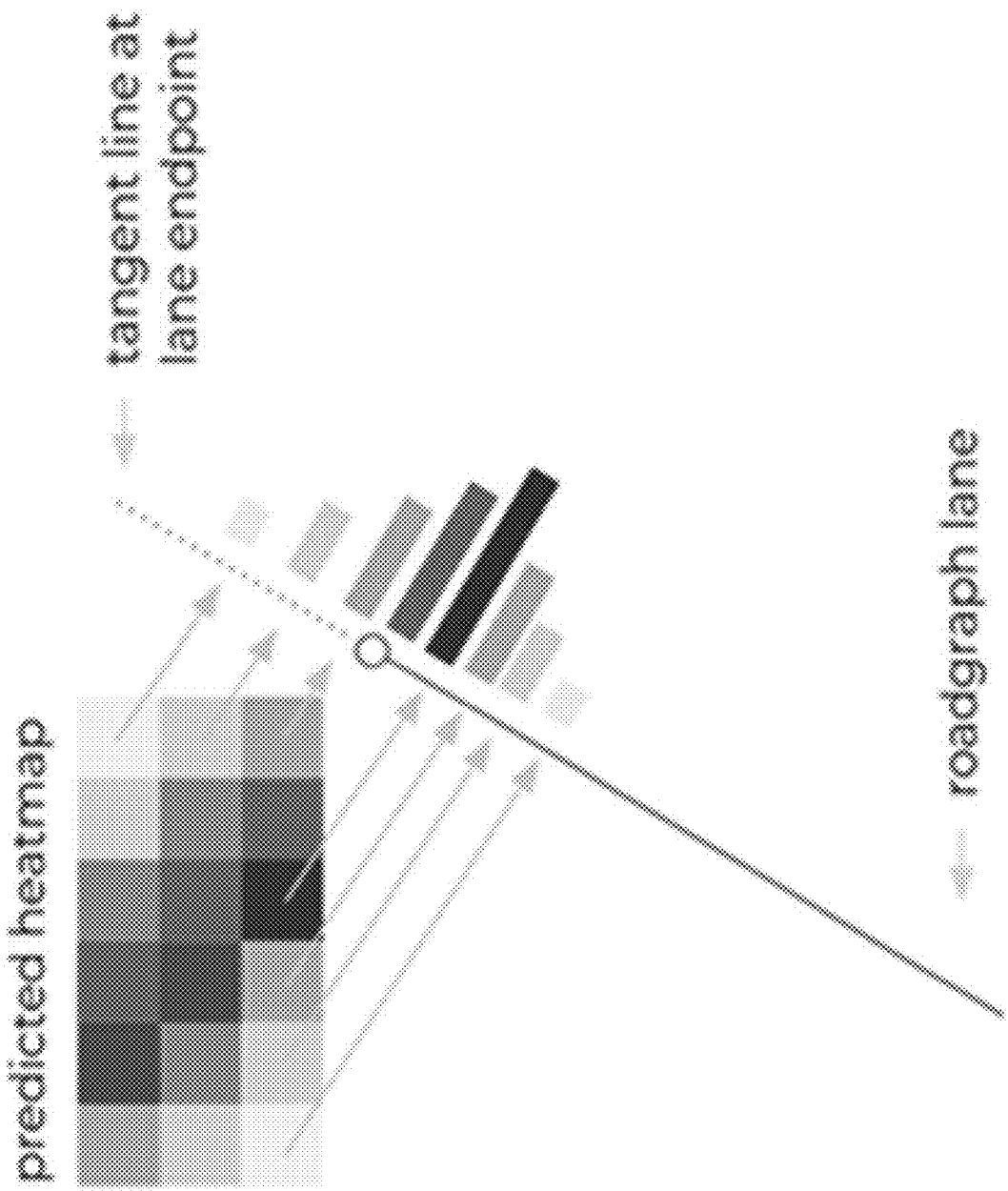

The reason for using a "thin" label is that this representation makes it easier to retrieve the distribution from it. Under this setting, the value of an output heat map pixel is actually the convolution of the underlying density function with the width of the label, as shown in view 1100 of FIG. 11A. Then, as shown in view 1110 of FIG. 11B, heat map pixels within the region of interest (e.g., within bounding box 902) are selected and projected onto the lane tangent line. The projected points are weighted with the heat map values of their pixels. This will effectively provide a dense sampling of the density function. The weighted median of the projected points estimates the mean of the distribution, while the weighted standard deviation of the projected points estimates the standard deviation of the distribution.

Figure 11C:
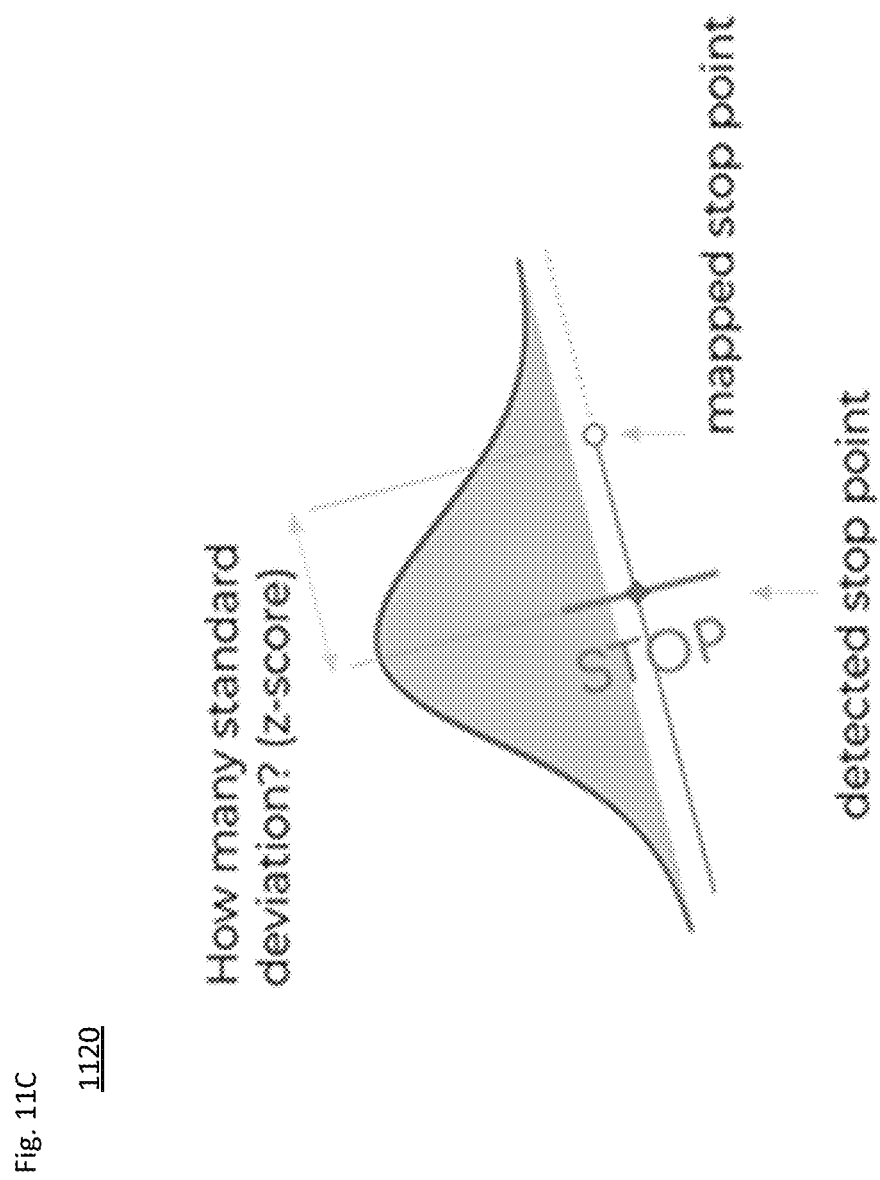
Figure 11E:
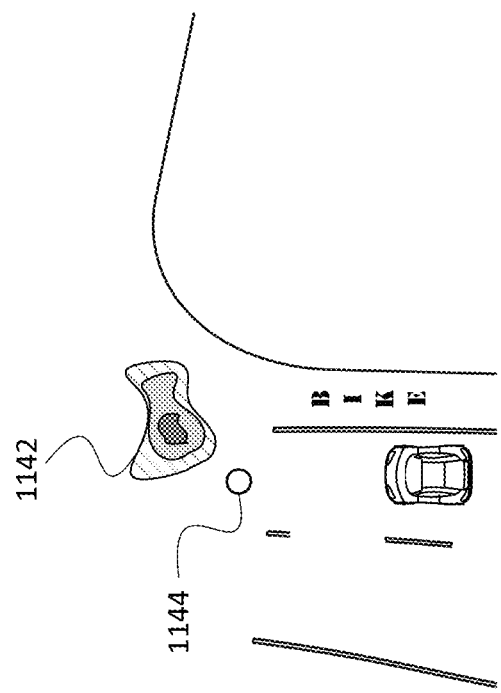
Figure 11D:
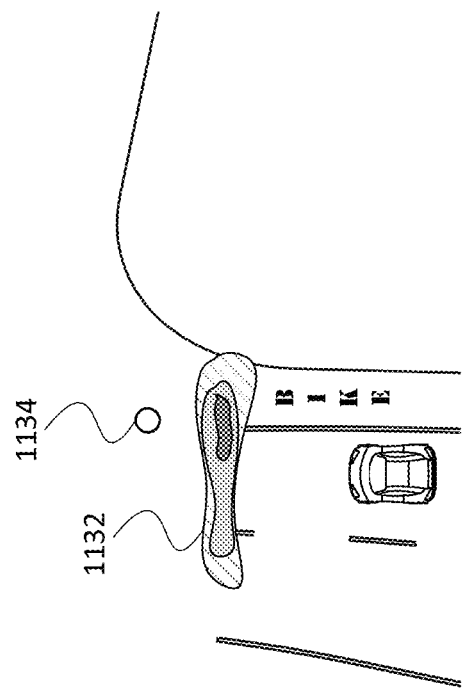

Knowing the mean and standard deviation of localization uncertainty, the system can estimate the likelihood of the mapped location. As shown in view 1120 of FIG. 11C, a z-score is used as a proxy to the likelihood. The higher the z-score is, the more likely there is a change. Note that the standard deviation will be different for stop line cases and no stop line cases. Thus, by setting a threshold on the z-score, the system effectively sets an adaptive threshold for both cases. This approach would obviate the need for the fixed threshold approach. FIGS. 11D and 11E illustrate two views 1130 and 1140, respectively, showing exemplary results for a stop line case and a no stop line case. In the example result for view 1130, the distance between the detected stop point along heat map 1132 and mapped stop point 1134 is 1.4 m, and the z-score is 3.2. And in the example result for view 1140, the distance between the detected stop point along heat map 1142 and mapped stop point 1144 is 3.0 m, with a z-score of 3.1. Notably, these two changes have similar z-scores, but their absolute change distances (1.4 m v. 3.0 m) differ significantly. This shows the adaptiveness of uncertainty-aware change detection.

Figure 11F:
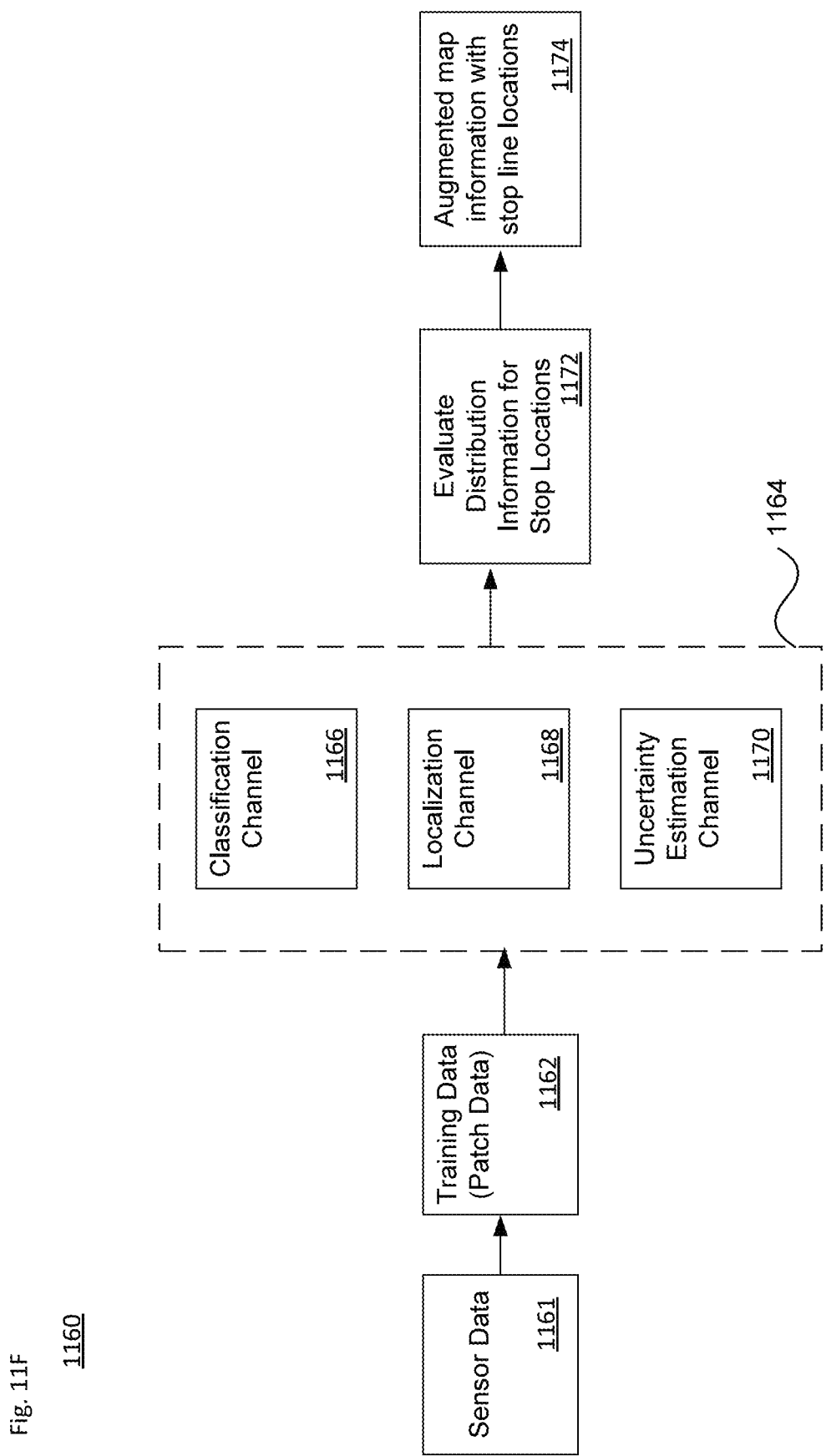

FIG. 11F illustrates an example 1160 of how the neural network may implement the channels. As shown input data 1162 is input to the neural network 1164. Raw sensor data 1161 received from sensors of vehicles may first be converted to training data (patch data), which is suitable for evaluation by the neural network. The input data 1162 is processed by the neural network, which produces three output channels; a classification channel 1166, a localization channel 1168 and an uncertainty estimation channel 1170 as discussed above. The output information associated with these channels is used to evaluate distribution information for stop locations at block 1172. And in this example, the output of the evaluation is used to augment map information with labeled stop line locations as shown in block 1174.

Implementation of the neural network may be done using the computing system of the self-driving vehicle (see 202 of FIG. 2 and 302 of FIG. 3). The resulting data, which can include augmented roadgraph data or other mapping information with stop locations, may be sent from a vehicle to a back-end system for dissemination to a fleet of vehicles configured to operate in an autonomous driving mode. For example, the back-end system can store and distribute the information across the fleet as needed. A given self-driving vehicle then uses this information as it is approaching an intersection, for instance as discussed further below.

Inferring Stop Location from Neural Network Output

Figure 12B:
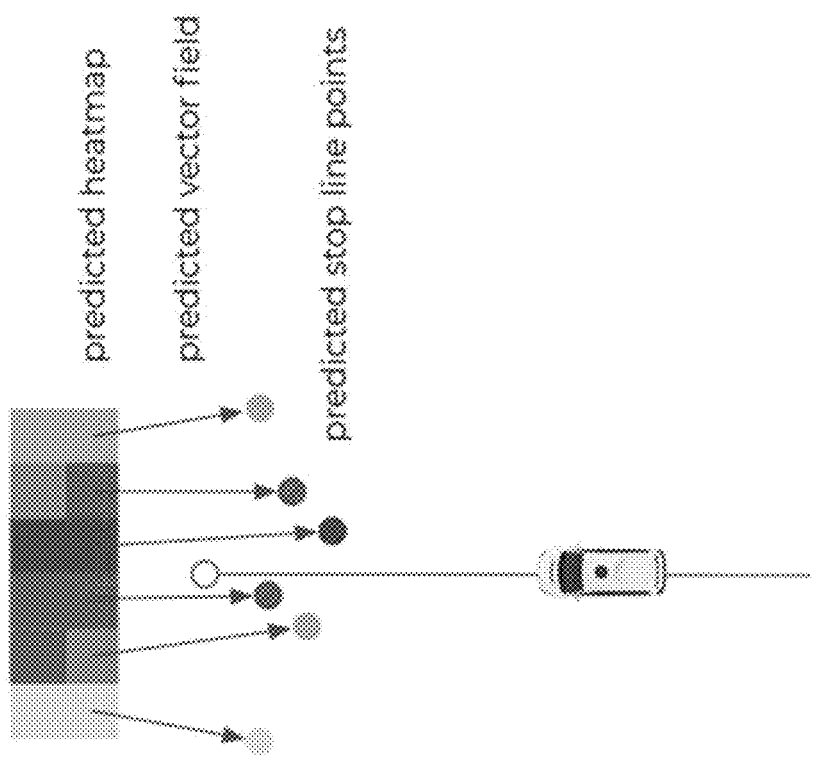
FIGS. 12A-D illustrate a process for inferring a stop location in accordance with aspects of the technology.
Figure 12A:
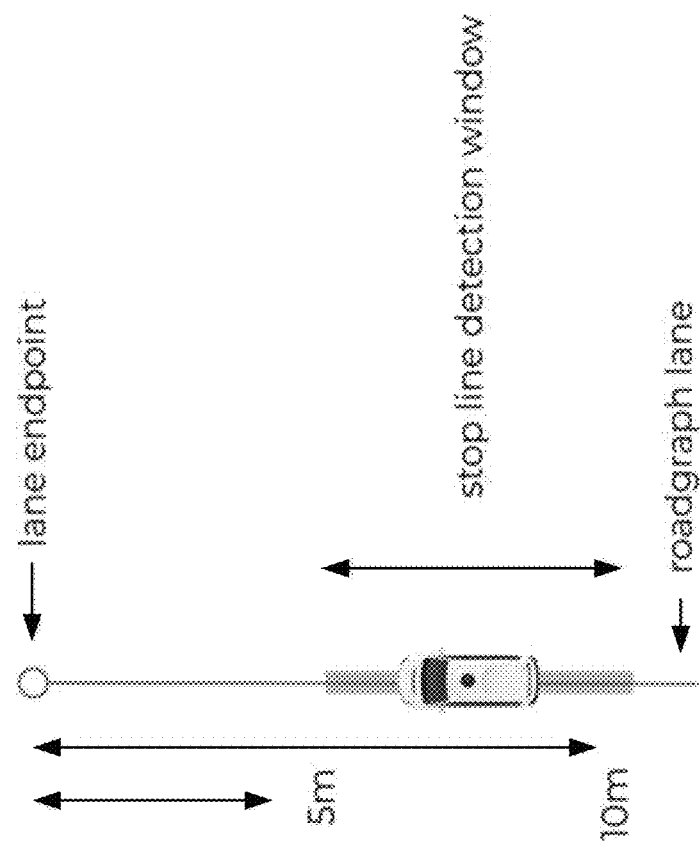

The stop location detection system may only be activated when the self-driving vehicle is within a threshold region of a lane endpoint, for instance no further than about 10 m-15 m and no closer than about 4 m-7 m to the lane endpoint. This threshold region is set to ensure good visibility of the stop location in both camera and laser images. The threshold region may vary according to vehicle size, type and/or sensor configuration. For instance, a large 18-wheel cargo truck may have a larger threshold region (e.g., no further than 15 m from the lane endpoint and no closer than 7 m to the endpoint) than a sedan (e.g., no further than 10 m from the lane endpoint and no closer than 4 m to the endpoint). FIG. 12A illustrates a view 1200 showing a vehicle on a roadgraph lane approaching a lane endpoint. The highlighted portion in front of and behind the vehicle is the stop line detection window.

Once the stop location detection system is activated, the neural network predicts the classification scores and localization offsets (or localization vectors) from the location of a pixel to its nearest point on stop line. These scores are the probabilities that corresponding pixels are on the stop location. FIG. 12B illustrates a view 1210 showing the predicted heat map and predicted vector field. The pixel locations combined with the predicted offset vectors should give predicted stop line points close to the stop line. These "stop line points" are weighted by the scores at the pixels that produced them.

Figure 12D:
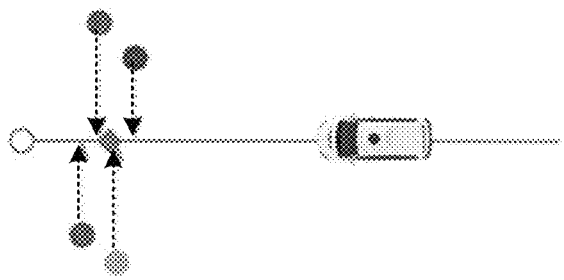
Figure 12C:
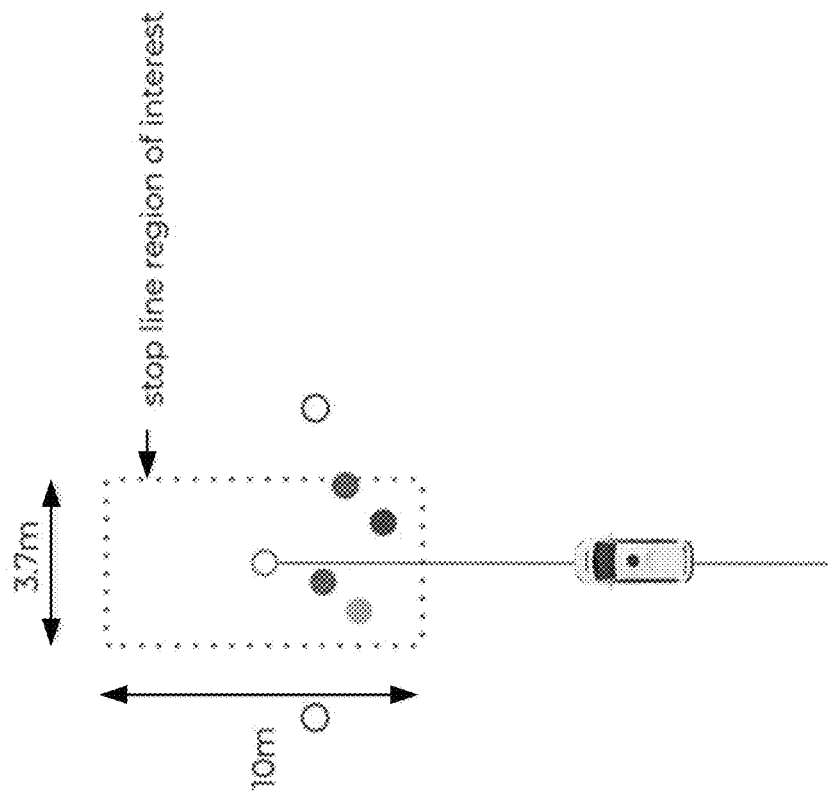

As shown in view 1220 of FIG. 12C, the system only keeps stop line points within a region of interest around the lane endpoint (e.g., a mapped stop location associated with a stop sign or other applicable signage). This region of interest represents an estimate of where a reasonable stop location could possibly be. As shown, it is wide along the lane direction to cover the distribution. Then, as shown in view 1230 of FIG. 12D, the remaining stop line points are projected to the lane tangent, and their weighted median will be the predicted stop location.

While the processing by the neural net may be performed by the onboard processing system of the self-driving vehicle, in another example offboard processing may be performed for one or more of the channels. For instance, a back-end system may perform fleet management operations for multiple self-driving vehicles, and may be capable of real time direct communication with some or all of the self-driving vehicles in the fleet. The back-end system may have more processing resources available to it than individual self-driving vehicles. Thus, in some situations the back-end system may be able to quickly perform the processing for the classification, localization and/or uncertainty estimation channels in real time, and relay that information to the self-driving vehicle so that it may modify its planned driving (e.g., stopping) operations accordingly.

In some examples, machine learning models, which may include neural networks, can be trained on map data and/or additional human labeled data (patch data), for instance to determine stop line versus no stop line situations. This may be done for different types of road environments, including urban, suburban and rural surface streets, highways, tunnels, bridges, etc., both with and without other nearby objects (e.g., cars or other vehicles on the roadway, adjacent buildings, vegetation, roadway dividers, etc.). The training may be based on gathered real-world data (e.g., that is labeled according to road environment, intersection type, signage such as stop or yield signs, etc.). From this, one or more models may be developed and used in real-time evaluation by the self-driving vehicles, after the fact (e.g., post-processing) evaluation by the back-end system, or both. By way of example, the model structure may be a deep net, where the exact structure and parameters can be searched through automated machine learning, e.g., using a Neural Architecture Search (NAS) type model. Based on this, the onboard system (e.g., planner module and/or navigation system of the vehicle's autonomous driving system) can utilize the model(s) to evaluate stop line and no stop line situations and select an appropriate stop point at an intersection.

As noted above, the technology is applicable for various types of self-driving vehicles, including passenger cars, buses, motorcycles, emergency vehicles, RVs, construction vehicles, and large trucks or other cargo carrying vehicles. In addition to using the stop location information for operation of an individual self-driving vehicle, this information may also be shared with other self-driving vehicles, such as vehicles that are part of a fleet.

Figure 13A:
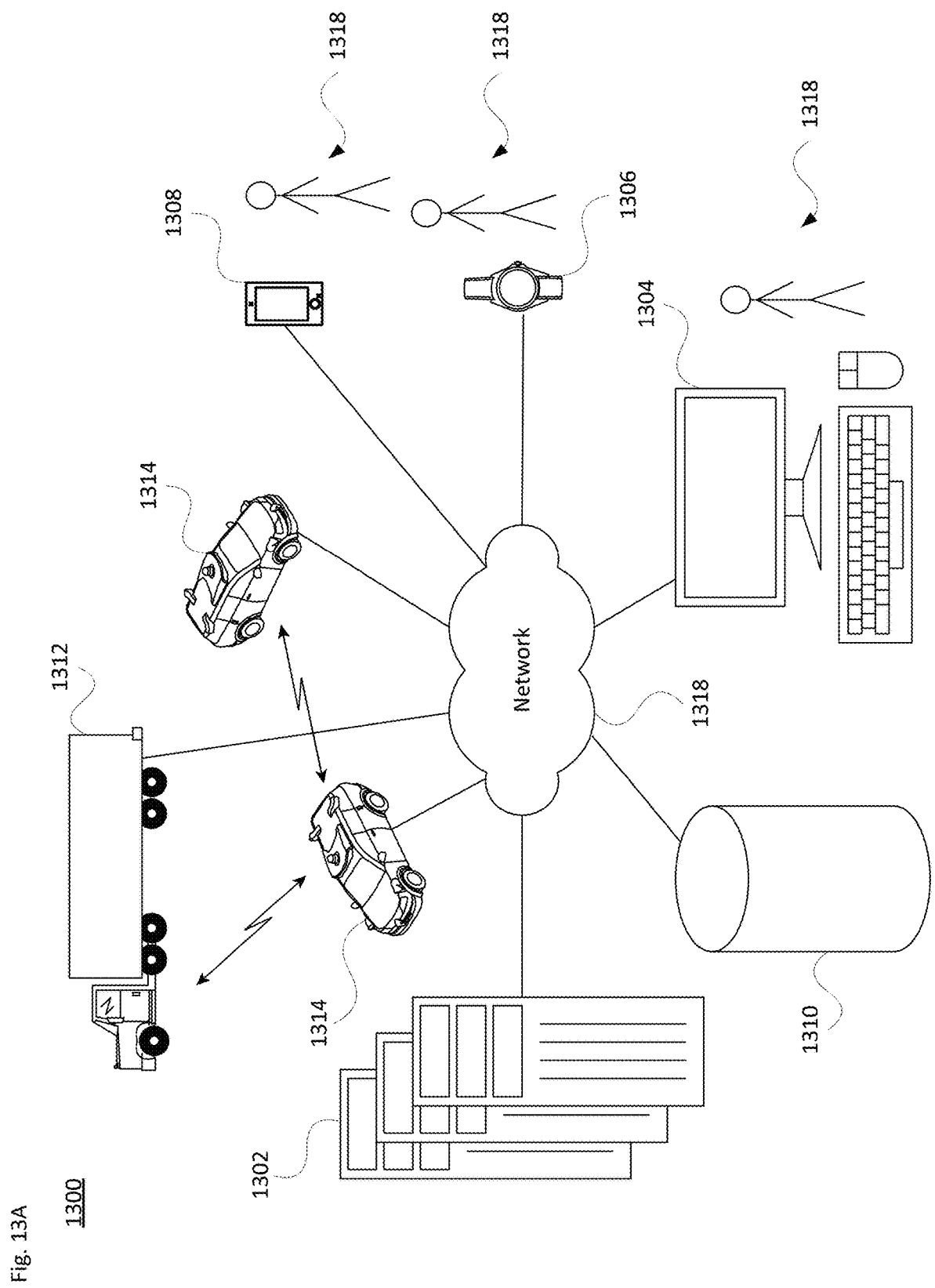
FIGS. 13A-B illustrate an example system in accordance with aspects of the technology.
Figure 13B:
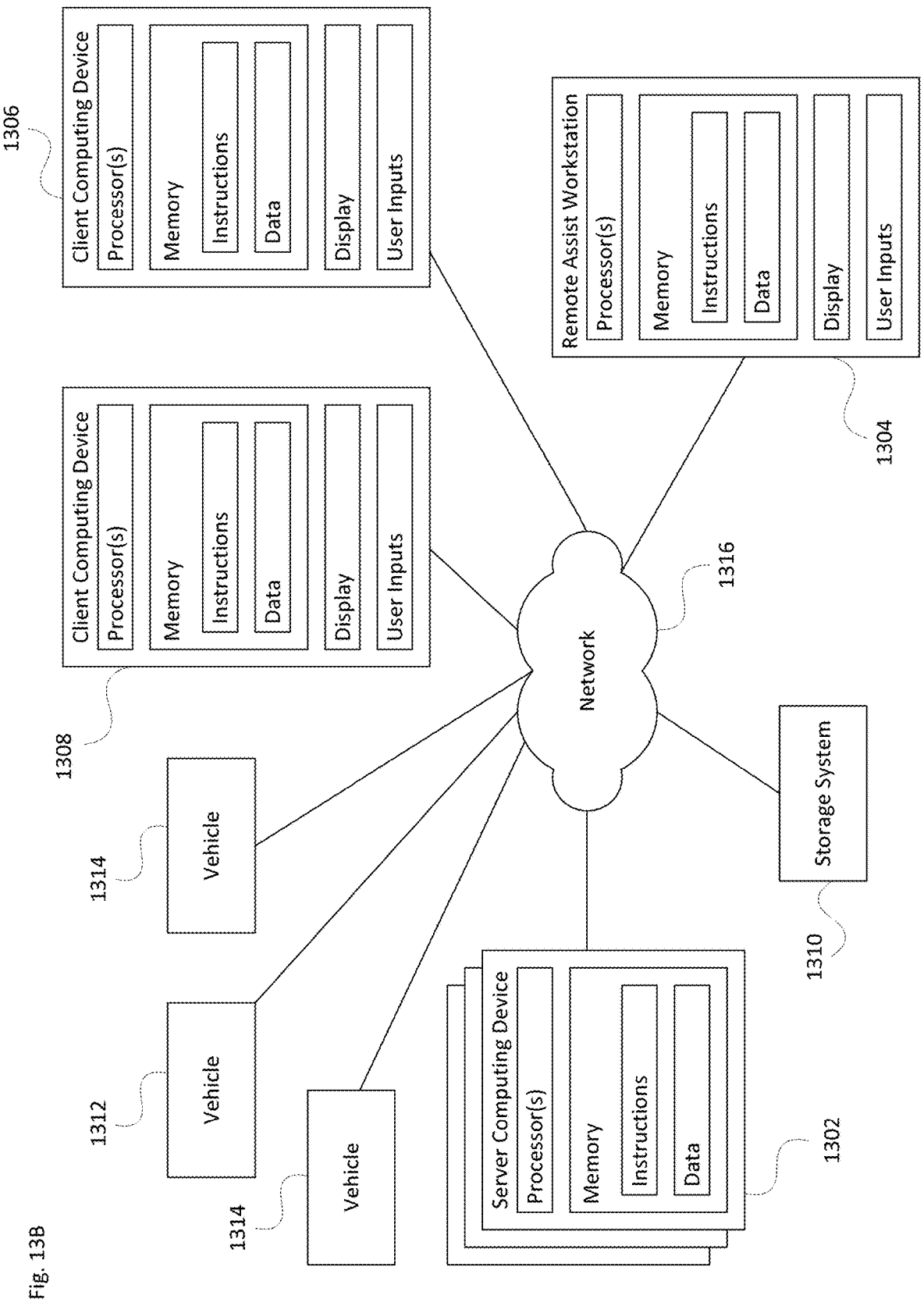

One example of this is shown in FIGS. 13A and 13B. In particular, FIGS. 13A and 13B are pictorial and functional diagrams, respectively, of an example system 1300 that includes a plurality of computing devices 1302, 1304, 1306, 1308 and a storage system 1310 connected via a network 1316. System 1300 also includes vehicles 1312 and 1314 configured to operate in an autonomous driving mode, which may be configured the same as or similarly to vehicles 100 and 150 of FIGS. 1A-B and 1C-D, respectively. Vehicles 1312 and/or vehicles 1314 may be parts of one or more fleets of vehicles that provide rides for passengers or deliver packages, groceries, cargo or other items to customers. Although only a few vehicles and computing devices are depicted for simplicity, a typical system may include significantly more.

As shown in FIG. 13B, each of computing devices 1302, 1304, 1306 and 1308 may include one or more processors, memory, data and instructions. Such processors, memories, data and instructions may be configured similarly to the ones described above with regard to FIG. 2 or 3A.

The various computing devices and vehicles may communicate directly or indirectly via one or more networks, such as network 1316. The network 1316, and intervening nodes, may include various configurations and protocols including short range communication protocols such as Bluetooth™, Bluetooth LE™, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, computing device 1302 may include one or more server computing devices having a plurality of computing devices, e.g., a load balanced server farm, that exchange information with different nodes of a network for the purpose of receiving, processing and transmitting the data to and from other computing devices. For instance, computing device 1302 may include one or more server computing devices that are capable of communicating with the computing devices of vehicles 1312 and/or 1314, as well as computing devices 1304, 1306 and 1308 via the network 1316. For example, vehicles 1312 and/or 1314 may be a part of a fleet of self-driving vehicles that can be dispatched by a server computing device to various locations. In this regard, the computing device 1302 may function as a dispatching server computing system which can be used to dispatch vehicles to different locations in order to pick up and drop off passengers or to pick up and deliver cargo or other items. In addition, server computing device 1302 may use network 1316 to transmit and present information to a user of one of the other computing devices or a passenger of a vehicle. In this regard, computing devices 1304, 1306 and 1308 may be considered client computing devices.

As shown in FIGS. 13A-B each client computing device 1304, 1306 and 1308 may be a personal computing device intended for use by a respective user 1318, and have all of the components normally used in connection with a personal computing device including a one or more processors (e.g., a central processing unit (CPU)), memory (e.g., RAM and internal hard drives) storing data and instructions, a display (e.g., a monitor having a screen, a touchscreen, a projector, a television, or other device such as a smart watch display that is operable to display information), and user input devices (e.g., a mouse, keyboard, touchscreen or microphone). The client computing devices may also include a camera for recording video streams, speakers, a network interface device, and all of the components used for connecting these elements to one another.

Although the client computing devices may each comprise a full-sized personal computing device, they may alternatively comprise mobile computing devices capable of wirelessly exchanging data with a server over a network such as the Internet. By way of example only, client computing devices 1306 and 1308 may be mobile phones or devices such as a wireless-enabled PDA, a tablet PC, a wearable computing device (e.g., a smartwatch), or a netbook that is capable of obtaining information via the Internet or other networks.

In some examples, client computing device 1304 may be a remote assistance workstation used by an administrator or operator to communicate with riders of dispatched vehicles. Although only a single remote assistance workstation 1304 is shown in FIGS. 13A-B, any number of such workstations may be included in a given system. Moreover, although operations workstation is depicted as a desktop-type computer, operations workstations may include various types of personal computing devices such as laptops, netbooks, tablet computers, etc. By way of example, the remote assistance workstation may be used by a technician or other user to help process patch data, including labeling of stop locations for stop line and/or no stop line locations.

Storage system 1310 can be of any type of computerized storage capable of storing information accessible by the server computing devices 1302, such as a hard-drive, memory card, ROM, RAM, DVD, CD-ROM, flash drive and/or tape drive. In addition, storage system 1310 may include a distributed storage system where data is stored on a plurality of different storage devices which may be physically located at the same or different geographic locations. Storage system 1310 may be connected to the computing devices via the network 1316 as shown in FIGS. 13A-B, and/or may be directly connected to or incorporated into any of the computing devices.

Storage system 1310 may store various types of information. For instance, the storage system 1310 may store autonomous vehicle control software which is to be used by vehicles, such as vehicles 1312 or 1314, to operate such vehicles in an autonomous driving mode. Storage system 1310 may also store labeled or unlabeled patch data, change detection information or other data relating to stop locations that can be used to train a machine learning model from prior map data and/or additional human labeled data. Model information may be shared with specific vehicles or the fleet as needed. It may be updated in real time, periodically, or off-line as additional stop location information is obtained. The storage system 1310 can also include route information, weather information, etc. This information may be shared with the vehicles 1312 and 1314, for instance to help with operating the vehicles in an autonomous driving mode.

FIG. 14 illustrates a flow diagram 1400 according to one aspect of the technology, which provides a training method used for determining a stop location for a vehicle operating in an autonomous driving mode. A set of training data (e.g., derived from received sensor data) is evaluated at block 1402 to produce a classification channel to identify whether pixels in a subset of the training data are located within a selected distance of a stop line of a roadway. At block 1404, the system evaluates the training data to produce a localization channel to determine where a closest point is on the stop line for each pixel in the subset. At block 1406, the system evaluates the training data to produce an uncertainty estimation channel to generate a pixel distribution heatmap of possible stop locations. The operations 1402, 1404 and 1406 associated in accordance with the various channels may be performed in parallel or otherwise concurrently (see, e.g., block 1164 of FIG. 11F). At block 1408, based on the evaluations, the system generates distribution information for the possible stop locations. And at block 1410, the process augments map information with a most likely one of the possible stop locations based on the distribution information.

FIG. 15 illustrates a flow diagram 1500 according to one aspect of the technology, which provides a method of controlling a vehicle operating in an autonomous driving mode. At block 1502 the method includes receiving, by one or more sensors of a perception system of the vehicle, sensor data associated with objects in an external environment of the vehicle. At block 1504, the method determines, by one or more processors of the vehicle, whether the vehicle is within a threshold distance of a lane endpoint along a portion of a roadway. At block 1506, the processors perform, upon determining that the vehicle is within the threshold distance of the lane endpoint, stop location detection. As shown in blocks 1508-1512, this includes predicting a set of stop line points closest to an expected stop line (block 1508), discarding any of the set of stop line points not located within a region of interest associated with the lane endpoint (block 1510), and projecting any remaining stop line points of the set onto a lane tangent to identify a predicted stopping location (1512). And at block 1514, the method includes causing the vehicle to stop along the roadway according to the predicted stopping location.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A method of controlling a vehicle operating in an autonomous driving mode, the method comprising:
   receiving, by one or more sensors of a perception system of the vehicle, sensor data associated with objects in an external environment of the vehicle;
   determining, by one or more processors of the vehicle, whether the vehicle is within a threshold distance of a lane endpoint along a portion of a roadway;
   performing, by the one or more processors upon determining that the vehicle is within the threshold distance of the lane endpoint, stop location detection, wherein performing the stop location detection includes:
   mapping a set of stop line points closest to an expected stop line;
   discarding any of the set of stop line points not located within a region of interest associated with the lane endpoint; and
   projecting any remaining stop line points of the set onto a lane tangent to identify a mapped stopping location; and causing, by the one or more processors, the vehicle to stop along the roadway according to the mapped stopping location.

2. The method of claim 1, wherein the set of stop line points is mapped based on (i) a heat map according to the received sensor data and (ii) a vector field including a set of vectors, each vector being associated with a corresponding given pixel of a set of pixels in the heat map.

3. The method of claim 2, wherein the stop line points are weighted by scores at corresponding ones of the given pixels.

4. The method of claim 1, wherein the threshold distance is selected in accordance with sensor visibility for the one or more sensors of the perception system.

5. The method of claim 4, wherein the threshold distance is selected according to one or more of vehicle size, vehicle type or sensor configuration.

6. The method of claim 1, further comprising augmenting map information in accordance with the mapped stopping location.

7. A vehicle configured to operate in an autonomous driving mode, the vehicle comprising:
- a perception system including one or more sensors, the one or more sensors being configured to receive sensor data associated with objects in an external environment of the vehicle;
- a driving system including a steering subsystem, an acceleration subsystem and a deceleration subsystem to control driving of the vehicle;
- a positioning system configured to determine a current position of the vehicle; and
- a control system including one or more processors, the control system operatively coupled to the driving system, the perception system and the positioning system, the control system being configured to:
  - determine whether the vehicle is within a threshold distance of a lane endpoint along a portion of a roadway;
  - perform, upon determining that the vehicle is within the threshold distance of the lane endpoint, stop location detection, wherein the stop location detection includes:
    - mapped of a set of stop line points closest to an expected stop line;
    - discarding any of the set of stop line points not located within a region of interest associated with the lane endpoint; and
    - projection of any remaining stop line points of the set onto a lane tangent to identify a mapped stopping location; and
  - cause the vehicle to stop along the roadway according to the mapped stopping location.

8. The vehicle of claim 7, wherein mapping of the set of stop line points is based on (i) a heat map according to the received sensor data and (ii) a vector field including a set of vectors, each vector being associated with a corresponding given pixel of a set of pixels in the heat map.

9. The vehicle of claim 7, wherein the threshold distance is selected in accordance with sensor visibility for the one or more sensors of the perception system.

10. The vehicle of claim 9, wherein the threshold distance is selected according to one or more of vehicle size, vehicle type or sensor configuration.

* * * * *